US008112747B2

(12) United States Patent
Haeberle et al.

(10) Patent No.: US 8,112,747 B2
(45) Date of Patent: Feb. 7, 2012

(54) INTEGRATED SOFTWARE SUPPORT FOR A DISTRIBUTED BUSINESS APPLICATION WITH SEAMLESS BACKEND COMMUNICATIONS

(75) Inventors: Tilmann Haeberle, Wiesloch (DE);
Lilia Kotchanovskaia, Heidelberg (DE);
Thomas Schneider, Heidelberg (DE);
Uta Prigge, Heidelberg (DE);
Alexander Gerber, Heidelberg (DE);
Sebastian Pulkowski, St. Leon-Rot (DE); Jan Jansen, Sinsheim (DE);
Dorothea Hoefler, Sinsheim (DE);
Herbert Stegmueller, Bruchsal (DE);
Karolin Laicher, Rauenberg (DE)

(73) Assignee: SAP AG, Walldorf (DE)

( * ) Notice: Subject to any disclaimer, the term of this patent is extended or adjusted under 35 U.S.C. 154(b) by 1277 days.

(21) Appl. No.: 11/604,457

(22) Filed: Nov. 27, 2006

(65) Prior Publication Data
US 2008/0126110 A1   May 29, 2008

(51) Int. Cl.
*G06F 9/44* (2006.01)
*G06F 9/445* (2006.01)
*G06F 15/173* (2006.01)
(52) U.S. Cl. ......... 717/172; 717/177; 717/127; 709/224
(58) Field of Classification Search .................. None
See application file for complete search history.

(56) References Cited

U.S. PATENT DOCUMENTS

| | | | | |
|---|---|---|---|---|
| 6,177,932 B1 * | 1/2001 | Galdes et al. | ............... | 715/733 |
| 6,470,496 B1 * | 10/2002 | Kato et al. | ............... | 717/173 |
| 6,477,578 B1 * | 11/2002 | Mhoon | ............... | 709/229 |
| 6,487,718 B1 * | 11/2002 | Rodriguez et al. | ............ | 717/177 |
| 6,606,744 B1 * | 8/2003 | Mikurak | ............... | 717/174 |
| 6,970,924 B1 * | 11/2005 | Chu et al. | ............... | 709/224 |
| 7,350,205 B2 * | 3/2008 | Ji | ............... | 717/172 |
| 7,506,338 B2 * | 3/2009 | Alpern et al. | ............... | 717/177 |
| 7,676,804 B2 * | 3/2010 | Ferguson et al. | ............ | 717/173 |
| 2003/0084434 A1 * | 5/2003 | Ren | ............... | 717/172 |
| 2004/0003266 A1 * | 1/2004 | Moshir et al. | ............... | 713/191 |
| 2004/0031030 A1 * | 2/2004 | Kidder et al. | ............... | 717/172 |
| 2005/0262498 A1 * | 11/2005 | Ferguson et al. | ............ | 717/172 |
| 2006/0155756 A1 * | 7/2006 | Stanev et al. | ............ | 707/103 R |
| 2007/0050678 A1 * | 3/2007 | Estes et al. | ............... | 714/38 |

OTHER PUBLICATIONS

Alexander Keller and Gautam Kar, Determining Service Dependencies in Distributed Systems [online], Jun. 2001 [retrieved on 922-2011], pp. 1-5. Retrieved from the Internet: <http://ieeexplore.ieee.org/stamp/stamp.jsp?arnumber=00937026>.*
Robert Szewczyk at el., An Analysis of a Large Scale Habitat Monitoring Application [online], Nov. 2004 [retrieved on Sep. 22, 2011], pp. 214-226. Retrieved from the Internet: <URL: http://delivery.acm.org/10.1145/1040000/1031521/p214-szewczyk.pdf>.*

* cited by examiner

*Primary Examiner* — Thuy Dao
*Assistant Examiner* — Hanh Bui
(74) *Attorney, Agent, or Firm* — Fish & Richardson P.C.

(57) ABSTRACT

The disclosure provides integrated software for supporting a distributed business application comprising computer readable instructions embodied on media. The integrated support software is operable to automatically monitor the distributed business application for potential incidents. It also facilitates continuous data exchange between the distributed business application and a remote support module based on the automatic monitoring, with the communications in a protocol associated with a plurality of services in the distributed business application and with a plurality of incidents for these services. Upon identification of a potential incident, the software provides integrated incident management in the distributed business application and provides software maintenance management to the distributed business application for one or more identified incidents.

20 Claims, 12 Drawing Sheets

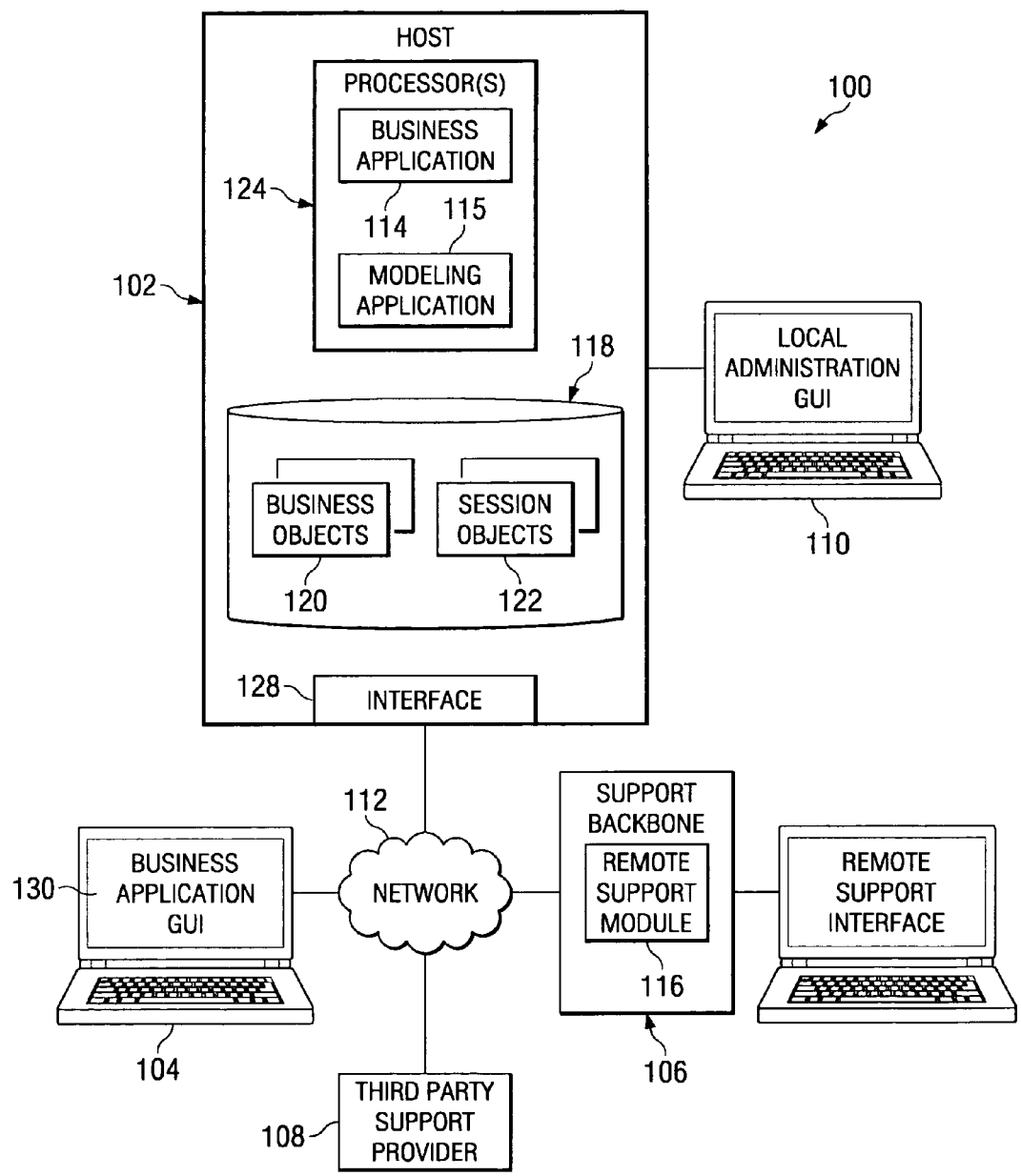

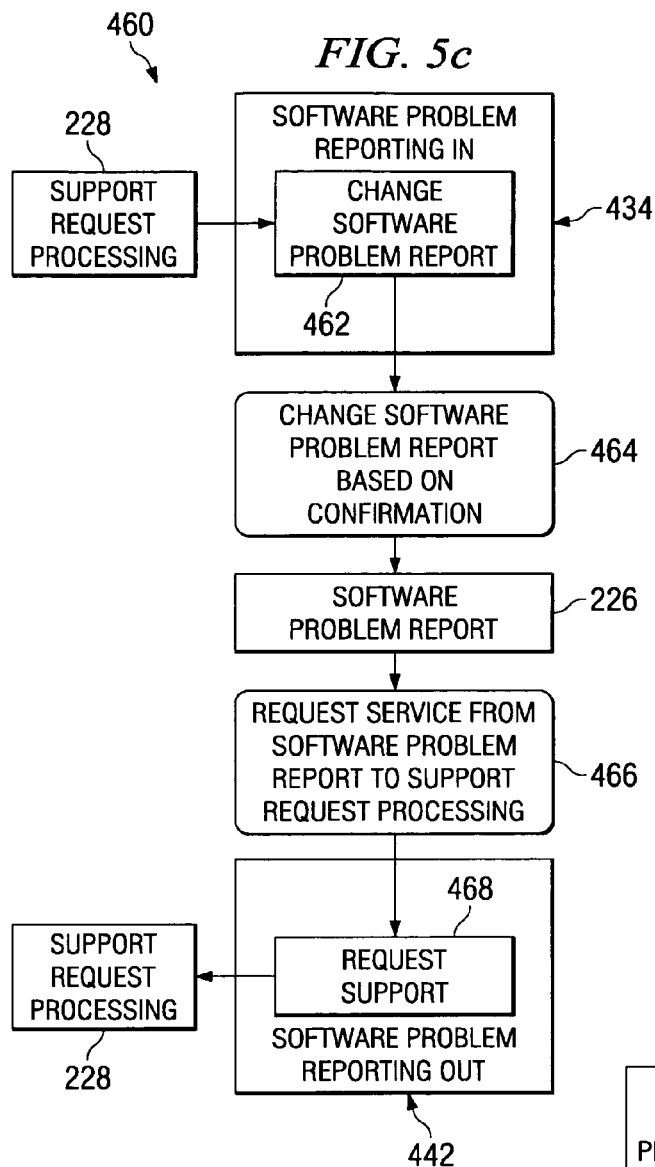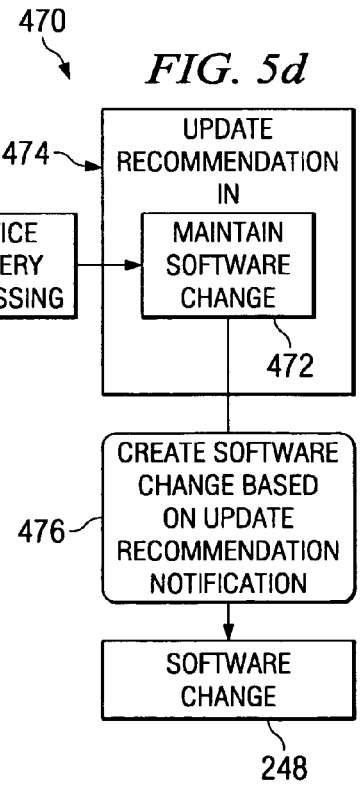

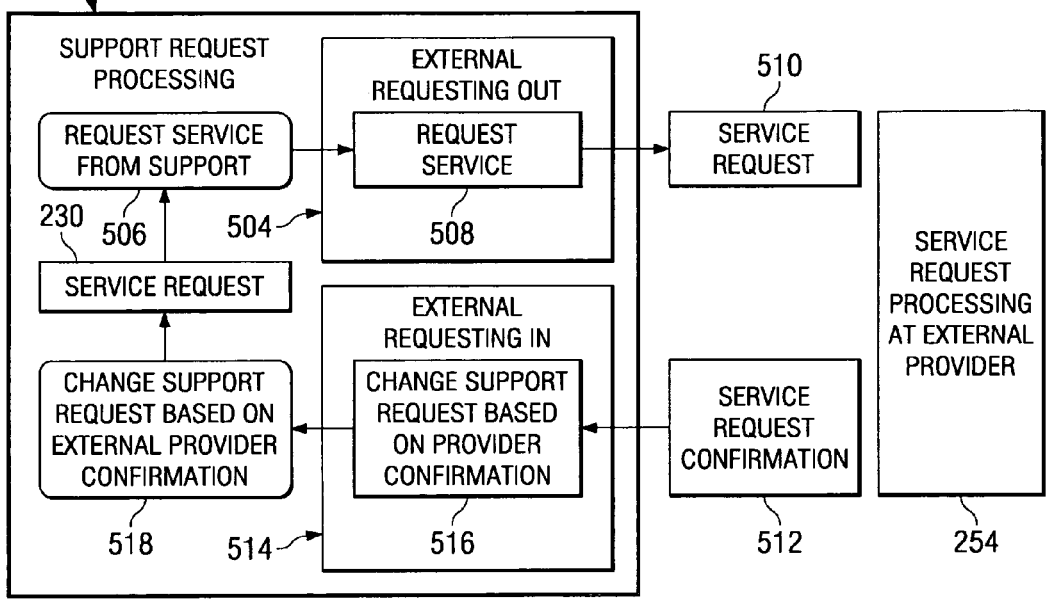
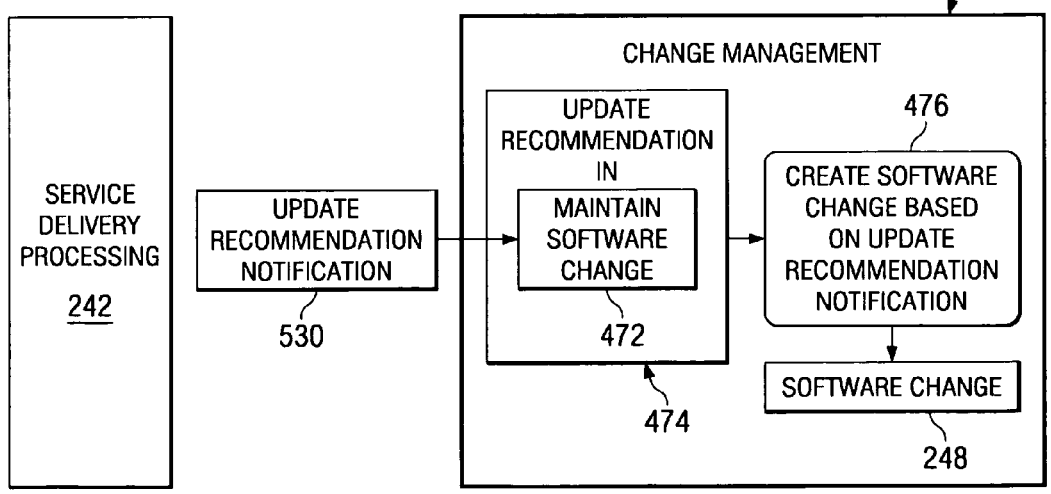

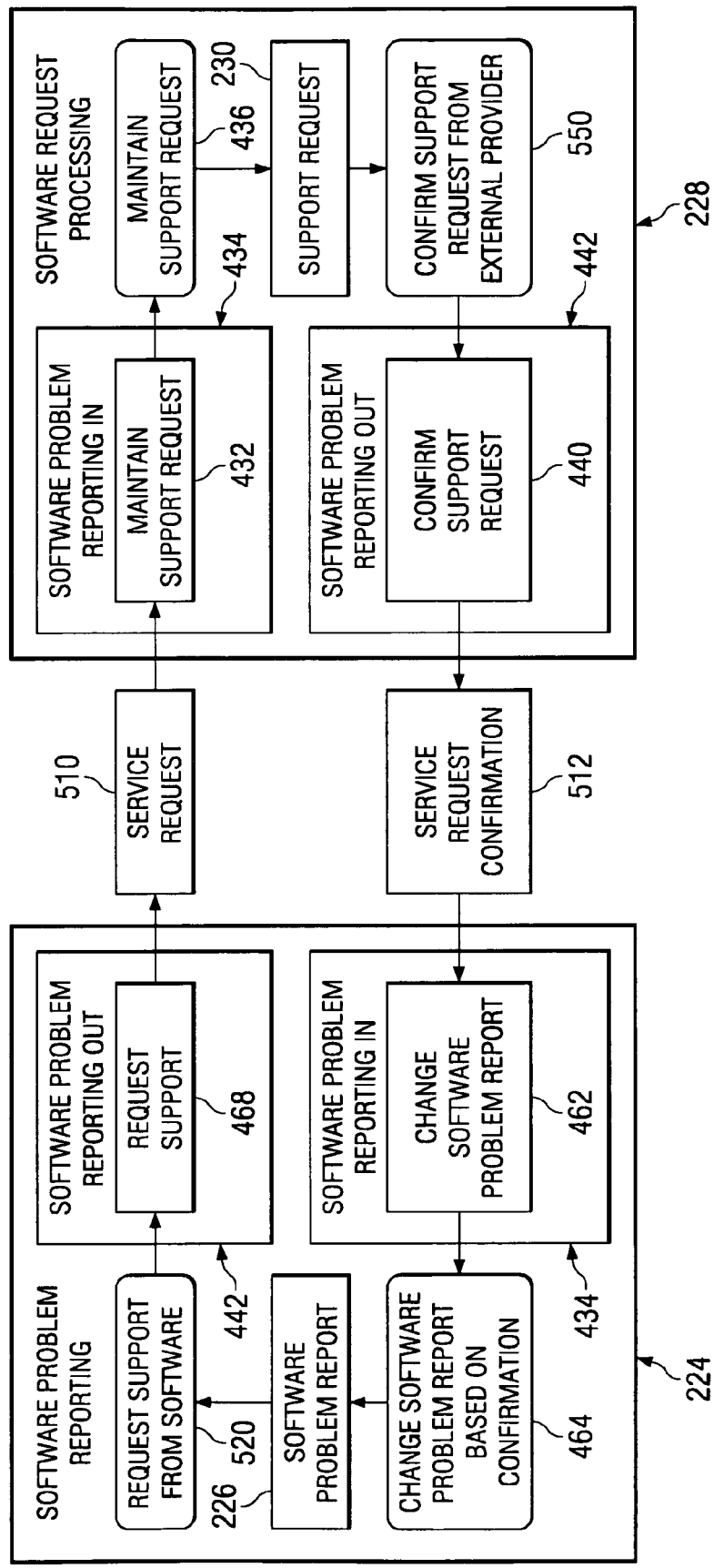

INTEGRATED SOFTWARE SUPPORT FOR A DISTRIBUTED BUSINESS APPLICATION WITH SEAMLESS BACKEND COMMUNICATIONS

TECHNICAL FIELD

This disclosure relates to computer processing and, more particularly, to integrated software support for a distributed business application with seamless backend communications.

BACKGROUND

An enterprise, or its computing systems, may employ various software packages to manage data within the organization. The software portion of an enterprise computing system may include various modules that may be used alone or be integrated with other modules. For example, an organization may employ a supply chain management (SCM) module to support the organization's manufacturing operations; another organization may employ a customer relations management (CRM) module to log interactions between, for example, a marketing department and a prospective customer or a support department and a current customer; and yet another example organization may employ a financials module to budget its operations, pay suppliers and employees, and receive payment from customers. Some organizations may employ an enterprise resource planning (ERP) system that integrates each of these modules into a single system. Many large organizations utilize enterprise software, such as ERP software, to centrally manage data for various departments of the organization and to automate various organization activities. In general, ERP software allows a company to efficiently process data that is used by multiple departments. As an example, a manufacturing company may employ an ERP system to manage its manufacturing, sales, and financial departments. More particularly, an ERP system may provide resources for a sales department to track orders for products; resources for a purchasing department to track orders for parts needed to manufacture the ordered products; resources for a manufacturing department to track products through the manufacturing process and to manage inventory; resources for a sales department to track order fulfillment and generally manage interactions with customers; and resources for a financial department to track parts costs, pay suppliers, track orders and process payments for fulfilled orders.

In short, these distributed applications use business logic and data that span web servers, application servers, middleware, and mainframe systems. While most businesses have traditional monitoring software to manage these complex applications, many lack an integrated solution to automatically monitor, analyze and resolve problems at the service, transaction, application and resource levels, and to immediately respond to detected problems in a timely fashion or to predict problems that may lie ahead.

Such conventional information technology (IT) systems require considerable time, effort, knowledge and experience in order to implement, monitor, and operate on a day-to-day basis. Even large IT departments often become lost in a maze of complex tools and technologies and thousands of pages of administration guides that are usually necessary to operate and maintain the components of the distributed applications. Moreover, IT departments, in particular IT administrators, can be overwhelmed with various day-to-day reactive support tasks and often have limited resources and operating budgets to handle those support tasks. Such tasks typically include normal system management activities, such as manually monitoring, checking and clearing log files, performing patches and updates, executing backup and recovery procedures, and end user management and assistance, such as processing service requests and supporting end users having trouble with the customer's systems. The task of manually monitoring each component of the IT system to ensure the health of the system is particularly difficult for many IT departments.

Moreover, as enterprise software deployments increase in complexity, the costs for supporting such deployments are additionally increasing (and comprise a large portion of the total cost of ownership of enterprise software). With conventional systems, the support load normally scales up with a number of users. Therefore, there is often little (if any) cost savings in large deployments. This lack of cost savings is based, in part, on the fact that such arrangements are often inefficient (e.g., support requests are often not routed to the correct entities), fault-prone (e.g., users often do not adequately describe the situation requiring support and its context), and time-intensive (e.g., the situation requiring support cannot be simulated). Such conventional support processes are often not repeatable as a structured mechanism for symptom description and cause identification, nor do such processes optimally resolve identified errors.

SUMMARY

The disclosure provides (perhaps highly) integrated software for supporting a distributed business application comprising computer readable instructions embodied on media. The integrated support software is operable to automatically monitor the distributed business application for potential incidents. It also facilitates continuous data exchange between the distributed business application and a remote support module based on the automatic monitoring, with the communications in a protocol associated with a plurality of services in the distributed business application and with a plurality of incidents for these services. Upon identification of a potential incident, the software provides integrated incident management in the distributed business application and provides software maintenance management to the distributed business application for the one or more identified incidents.

The foregoing example software—as well as other disclosed processes—may also be computer implementable methods. Moreover, some or all of these aspects may be further included in respective systems or other devices for supporting a distributed business application with seamless backend communications. The details of these and other aspects and embodiments of the disclosure are set forth in the accompanying drawings and the description below. Other features, objects, and advantages of the various embodiments will be apparent from the description and drawings, as well as from the claims.

DESCRIPTION OF DRAWINGS

FIG. 1 illustrates an example system or distributed environment for supporting a distributed business application in accordance with one embodiment of the present disclosure;

FIG. 5C is a flowchart illustrating an example method implemented by a software problem reporting process component;

FIG. 5D is a flowchart illustrating an example method implemented by a change management process component;

FIG. 6A is a block diagram showing the interactions between the support request processing process component and a support request processing process component at an external support provider in accordance with one embodiment of FIG. 2;

FIG. 6B is an example diagram showing the interactions between the software problem reporting process component and the support request processing process component in accordance with one embodiment of FIG. 2;

FIG. 6C is a block diagram showing the interactions between the service delivery processing process component and the change management process component in accordance with one embodiment of FIG. 2;

DETAILED DESCRIPTION

Figure 2A:
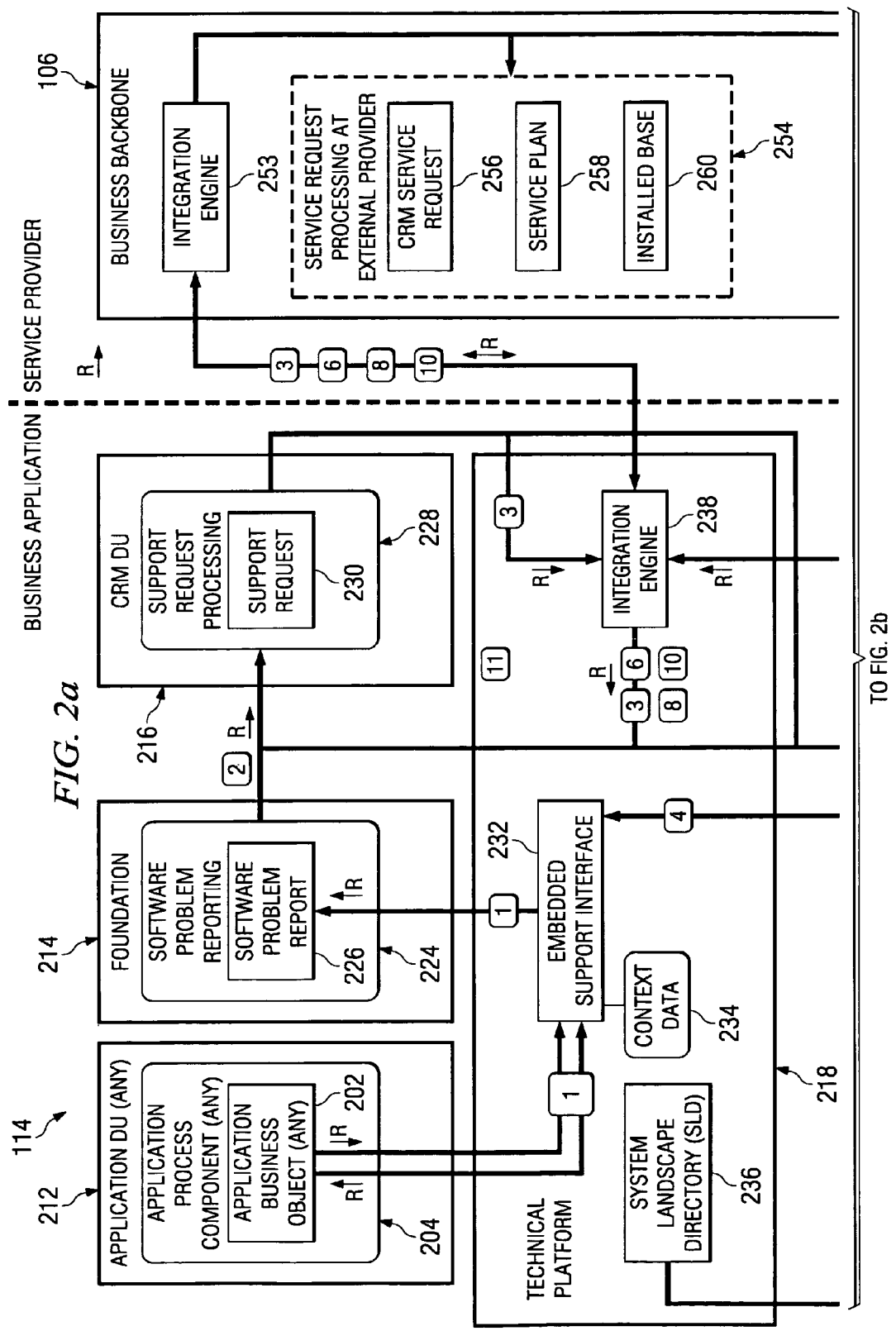
FIG. 2 illustrates an example architecture of the distributed business application of FIG. 1 implementing certain embedded support services.

FIG. 1 illustrates an example architecture or system 100 for supporting a distributed business application 114 (or its modeling system 115) in accordance with one embodiment of the present disclosure. This support generally includes (perhaps highly) integrated support services within the distributed application, such as embedded services, software maintenance management, and system or application health checks. For example, the system 100 may provide embedded services, such as upgrade patches and support activities, to business application 114 or the related modeling system 115 in a distributed application system. For illustration purposes, this distributed application 114 has been shown as residing or executing across server 102 and client 104. At least the integrated support software of distributed application 114 generally has seamless communications with support providers (whether backbone support provider 106 and/or third party support providers 108) such that support costs (whether direct or indirect) can be reduced, often dramatically.

In particular, these embedded services may include integrated software incident management with seamless integration to a support backbone 106 or a third party support provider 108. For example, the integrated support software may detect a potential software incident in the distributed business application 114 and collect comprehensive data regarding the software incident to send to a centralized support site, such as support backbone 106. Using these embedded services may allow for collaboration and continuous data exchanges regarding software incidents between (either or both of) the client system 104 and server 102 and (either or both of) the support backbone 106 and the third party support provider 108. The data exchanges may include requesting, providing, scheduling, and executing any software upgrades, patches, or other services in the hosted application 114. For example, embedded services may be presented by the support backbone 106 or third party support provider 108 in the form of software patches for updating application data or in the form of messages indicating updates or changes advised for the particular application instance. Upon execution of provided services, results regarding the execution may be sent back to the support backbone 106 or third party support providers 108 for further analysis. In some implementations, rather than sending a patch or upgrade, collected data may be analyzed and the results of the analysis may be sent back to a particular application 114 where a client can determine what services to request. In some cases, automating the delivery of integrated embedded services in the business application 114 may significantly reduce the operational workload on client support personnel and support provider personnel (administrators, help desk personnel, etc.). For example, the embedded services may automatically provide application monitoring, interface management, output management, user authorization management, automated services follow-up, and additional service delivery with little or no client or administrator 110 interaction.

In addition to incident management, system 100 may also include automated health checks and software maintenance management. The automated health check service can provide users (such as IT administrators) with instant access to information and eliminate the need for manual monitoring. The automated health checks automatically observe the system and attempt to address potential issues proactively. In this way, system 100 may be self-healing (with little or no administrator interaction) after an incident or implement other automatic resolution prior to a potential incident occurring. The software maintenance management service provides one-click update installation triggered by health checks or other data collection/monitoring services and also provides proactive notification of updates available for download.

These embedded services may utilize automated and continuous exchange of information to maintain an enterprise computing system. It will be understood that these continuous communications may not necessarily occur at all times, but may instead occur on an as-needed basis so long as the distributed application 114 and the support providers 108 remain communicably coupled as appropriate or that information is easily and quickly provided. More particularly, information may be collected from various sources within the enterprise computing system, aggregated, formatted into a standard format, and transmitted to a third party. In response to the transmitted information, follow-up information may be received from the third party. The follow-up information may include, for example, customized or generic software updates to various components of the distributed application 114, new features for implementation in the distributed application 114, or reports providing analysis of the transmitted information. Moreover, the systems and techniques may be used by a software provider to manage licenses or to gather data for internal planning (e.g., planning future improvements to the enterprise software) or by a third-party service provider to provide service for an enterprise system (e.g., preventative system checks or monitoring and optional application of software patches in response to preventative system checks or monitoring). The standard format of the transmitted information may more easily allow various third parties to identify issues and provide other custom services or follow-up information in response to the transmitted information.

System 100 is typically a distributed client/server system that spans one or more networks such as 112. Rather than being delivered as packaged software, system 100 may represent a hosted solution, often for an enterprise or other small business, that may scale cost-effectively and help drive faster adoption. In this case, portions of the hosted solution may be developed by a first entity, while other components are developed by a second entity. For example, a software patch may be developed by an internal support party, while the software the patch updates is developed by a third party. Moreover, the processes or activities of the hosted solution may be distributed amongst these entities and their respective components. In another example, system 100 may implement a component-based architecture. But system 100 may be in a dedicated enterprise environment—across a local area network (LAN) or subnet—or any other suitable environment without departing from the scope of this disclosure.

Turning to the illustrated embodiment, system 100 includes or is communicably coupled with server 102, one or more client systems 104, and the support backbone 106, at least some of which communicate across network 112. Server 102 comprises an electronic computing device operable to receive, transmit, process and store data associated with system 100. For example, server 102 may be a Java 2 Platform, Enterprise Edition (J2EE)-compliant application server that includes Java technologies such as Enterprise JavaBeans (EJB), J2EE Connector Architecture (JCA), Java Messaging Service (JMS), Java Naming and Directory Interface (JNDI), and Java Database Connectivity (JDBC). Each computer is generally intended to encompass any suitable processing device. But it will be understood that FIG. 1 provides merely one example of computers that may be used with the disclosure. For example, although FIG. 1 illustrates one server 102 that may be used with the disclosure, system 100 can be implemented using computers other than servers, as well as a server pool. Indeed, server 102 may be any computer or processing device such as, for example, a blade server, general-purpose personal computer (PC), Macintosh, workstation, Unix-based computer, or any other suitable device. In other words, the present disclosure contemplates computers other than general purpose computers as well as computers without conventional operating systems. Server 102 may be adapted to execute any operating system including Linux, UNIX, Windows Server, or any other suitable operating system. According to one embodiment, server 102 may also include or be communicably coupled with a web server and/or a mail server.

Client 104 (or more specifically in some cases, administrator 110) is any computing device operable to connect or communicate with server 102 or network 112 using any communication link. At a high level, each client 104 includes or executes at least a front-end or other GUI 130 of the distributed application 114 and comprises an electronic computing device operable to receive, transmit, process and store any appropriate data associated with system 100. It will be understood that there may be any number of clients 104 communicably coupled to server 102. Further, "client 104," "developer," "administrator," and "user" may be used interchangeably as appropriate without departing from the scope of this disclosure. Moreover, for ease of illustration, each client 104 is described in terms of being used by one user. But this disclosure contemplates that many users may use one computer or that one user may use multiple computers. As used in this disclosure, client 104 is intended to encompass a personal computer, touch screen terminal, workstation, network computer, kiosk, wireless data port, smart phone, personal data assistant (PDA), one or more processors within these or other devices, or any other suitable processing device. For example, client 104 may be a PDA operable to wirelessly connect with external or unsecured network. In another example, client 104 may comprise a laptop that includes an input device, such as a keypad, touch screen, mouse, or other device that can accept information, and an output device that conveys information associated with the operation of server 102 or clients 104, including digital data visual information via distributed business application 114. Both the input device and output device may include fixed or removable storage media such as a magnetic computer disk, CD-ROM, or other suitable media to both receive input from and provide output to users of clients 104 through the display, namely the client portion or front-end 130 of distributed application 114.

Front-end 130 of business application 114 generally comprises a graphical user interface operable to allow the user of client 104 to interface with at least a portion of system 100 for any suitable purpose, such as viewing application or other transaction data. Generally, GUI 130 provides the particular user with an efficient and user-friendly presentation of data provided by or communicated within system 100. As shown in later figures, GUI 130 may comprise a plurality of customizable frames or views having interactive fields, pull-down lists, and buttons operated by the user. For example, GUI 130 may present a software patch operable to manage and/or update application 114 or walk an administrator through a resolution. GUI 130 may also present a plurality of portals or dashboards. For example, GUI 130 may display a portal that allows users to view, create, and manage historical and real-time reports including role-based reporting and such. Of course, reports may be in any appropriate output format including PDF, HTML, and printable text. GUI 130 is often configurable, supporting a combination of tables and graphs (bar, line, pie, status dials, etc.). It should be understood that the term graphical user interface may be used in the singular or in the plural to describe one or more graphical user interfaces and each of the displays of a particular graphical user interface. Indeed, reference to GUI 130 may indicate a reference to the front-end or other interactive component of application 114, as well as the particular interface accessible via client 104, as appropriate, without departing from the scope of this disclosure. Therefore, GUI 130 contemplates any graphical user interface, such as a generic web browser or touchscreen, that processes information in system 100 and efficiently presents the results to the user. Server 102 can accept data from client 104 via a web browser (e.g., Microsoft Internet Explorer or Netscape Navigator) and return the appropriate HTML or XML responses to the browser using network 112.

Returning to server 102, it often includes local memory 118. Memory 118 may include any memory or database module and may take the form of volatile or non-volatile memory including, without limitation, magnetic media, optical media, random access memory (RAM), read-only memory (ROM), removable media, or any other suitable local or remote memory component. Illustrated memory 118 includes business objects 120 and session objects 122. But memory 118 may also include any other appropriate data such as VPN applications or services, firewall policies, a security or access log, print or other reporting files, HTML files or templates, data classes or object interfaces, unillustrated software applications or sub-systems, and others.

Figure 2B:
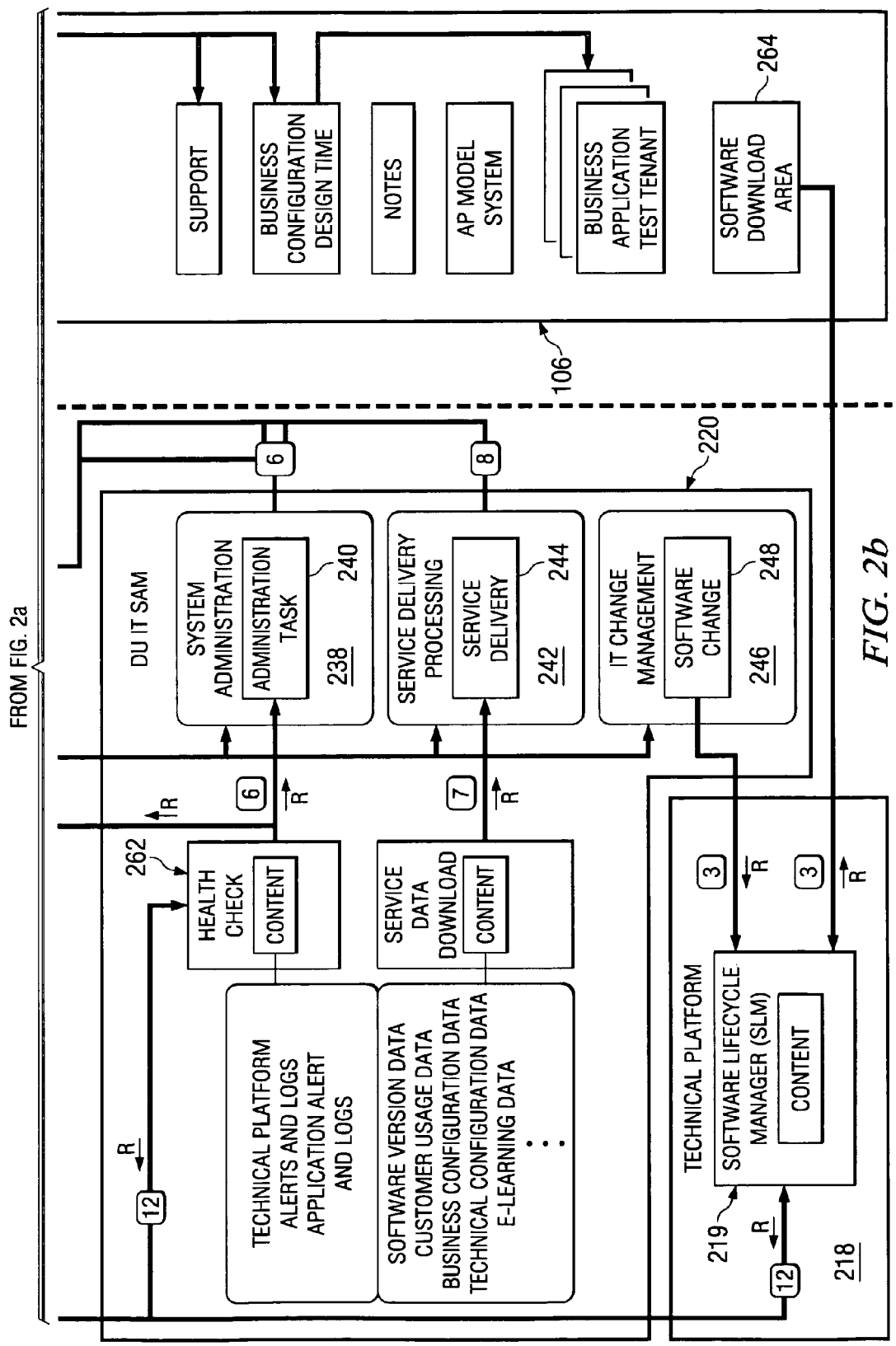

Illustrated business objects 120 are a representation of a type of a uniquely identifiable business entity (an object instance) described by a structural model as discussed in more detail in the description of FIG. 2. Illustrated session objects 122 may be represented by a particular business object in the system 100. As shown in more detail in FIG. 8, each service session object 122 may be assigned to several states throughout its life cycle. For example, the session object 122 may be associated or directly assigned many possible states including an initial state, a new state, an in preparation state, an in process state, a closed state, or a cancelled state. Of course, other additional or replacement states are possible. Service session object 122 can be generated and updated using business application software 114 to process and store specific context data for communication to a particular support provider.

Server 102 also includes processor 124. Processor 124 executes instructions and manipulates data to perform the operations of server 102 such as, for example, a central processing unit (CPU), a blade, an application specific integrated circuit (ASIC), or a field-programmable gate array (FPGA). Although FIG. 1 illustrates a single processor 124 in server 102, multiple processors 124 may be used according to particular needs and reference to processor 124 is meant to include multiple processors 124 where applicable. In the illustrated embodiment, processor 124 drives or executes at least a portion of distributed business application 114 or one of its services for use by client 104.

At a high level, the distributed business application 114 is operable to receive and/or process service requests from users and present at least a subset of the results to the particular user via an interface. More specifically, application 114 is any distributed business application, program, module, process, or other software that can be integrated with various support services. Regardless of the particular implementation, "software" may include software, firmware, wired or programmed hardware, or any combination thereof as appropriate. Indeed, application 114 may be written or described in any appropriate computer language including C, C++, Java, Visual Basic, assembler, Perl, any suitable version of 4GL, as well as others. It will be understood that while business application 114 is illustrated in FIG. 1 as a single distributed module that implements the various features and functionality through various objects, methods, or other processes, it may instead include a number of sub-modules, third party services, libraries, and such. For example, application 114 may be a composite or hosted application with any number of portions that may be implemented as Enterprise Java Beans (EJBs) or the design-time components may have the ability to generate run-time implementations into different platforms, such as J2EE, ABAP (Advanced Business Application Programming) objects, or Microsoft's .NET. Moreover, application 114 may be a child or sub-module of another software module or enterprise application (not illustrated) without departing from the scope of this disclosure.

Server 102 typically includes interface 128 for communicating with other computer systems, such as clients 104 or the support providers, over network 112 in a client-server or other distributed environment. In certain embodiments, server 102 receives data from internal or external senders through interface 128 for storage in memory 118 and/or processing by processor 124. Generally, interface 128 comprises logic encoded in software and/or hardware in a suitable combination and operable to communicate with network 112. More specifically, interface 128 may comprise software supporting one or more communications protocols associated with communications network 112 or hardware operable to communicate physical signals. Interface 128 may allow communications across network 112 via a virtual private network (VPN), SSH (Secure Shell) tunnel, or other secure network connection.

Network 112 facilitates wireless or wireline communication between computer server 102 and any other local or remote computer, such as clients 104. Network 112 may be all or a portion of an enterprise or secured network. In another example, network 112 may be a VPN merely between server 102 and client 104 across wireline or wireless link. Such an example wireless link may be via 802.11a, 802.11b, 802.11g, 802.20, WiMax, and many others. While illustrated as a single or continuous network, network 112 may be logically divided into various sub-nets or virtual networks without departing from the scope of this disclosure, so long as at least portion of network 112 may facilitate communications between server 102 and at least one client 104. In other words, network 112 encompasses any internal or external network, networks, sub-network, or combination thereof operable to facilitate communications between various computing components in system 100. Network 112 may communicate, for example, Internet Protocol (IP) packets, Frame Relay frames, Asynchronous Transfer Mode (ATM) cells, voice, video, data, and other suitable information between network addresses. Network 112 may include one or more local area networks (LANs), radio access networks (RANs), metropolitan area networks (MANs), wide area networks (WANs), all or a portion of the global computer network known as the Internet, and/or any other communication system or systems at one or more locations. In certain embodiments, network 112 may be a secure network associated with the enterprise and certain local or remote clients 104, as well as one or more support providers.

Server 102 is typically coupled with the application backend (or backbone) 106. Generally, support backbone 106 may process to automatically collected system context data associated with a particular distributed business application and execute or facilitate remote support for issues that may arise in the distributed application. The support backbone 106 may communicate the collected system data to the remote support module 116 for review by a support professional. Collected system data may be associated with specific deployable services pertaining to one or more business applications running on client systems 104. For example, if a software incident occurs in the business application 114, a message containing context data about the incident may be generated and sent to the support backbone 106 for analysis. The support backbone 106 may then collect further specific context data regarding the issue, propose a solution and/or execute a resolution based on the received context data and the collected context data. The support backbone 106 may also process error messages and route support requests based on received messages or a specific customer's identification. The support backbone 106 generally executes a remote support module 116 that may have access to several support resources, such as a user help desk, an application management system, a service delivery system, and a support interface.

The remote support module 116 is any software that may be used to extend support services to the distributed application. In particular, support may be extended to the distributed application in messages that include help content. The messages may be automatically created by the support backbone 106 and sent to servers 102, third party support providers 108, or administrators 110. The support backbone 106 may also receive messages from servers 102, third party support providers 108, and administrators 110. The remote support module 116 may receive application or other system data from the support backbone 106 in a previously specified or a generic protocol. This data may include general network specifications, such as, for example, a number of server devices, a number of client devices, or a network speed and topology description. The data may also include hardware specifications for server or client computer devices, such as, for example, processor type and speed, memory type and capacity, storage and operating system type, and version information. The data may further include information about a number of users with accounts on the enterprise computing system and a description and breakdown of the types of user accounts. Profile information corresponding to application packages or modules that are installed on the enterprise computing system can also be collected and utilized. The profile information may enumerate installed software components, licensed software modules, or data objects associated with installed components or licensed software modules. The profile information may also identify configuration parameters associated with installed or licensed software components, modules, or services, as well as a provider of such software. The system data can also include information about databases maintained by various software packages or modules, such as, for example, a database type, a description of the database structure, amount of memory or storage space allocated to the database, remaining capacity of the database, a number and a description of types of users associated with the database and memory (e.g., RAM or cache) usage profiles of the database. Specific context or other targeted system data may help identify or understand exceptions or potential issues that resulted from or during execution of the distributed business application 114 (or its modeling system 115) on the enterprise computing system, such as, for example, information about the exception itself, the software package or module that caused the exception, user-entered comments about the exception, and memory logs associated with the exception. This data can also be encapsulated in an extensible markup language (XML) message. The XML format for the message may enable the message to be conveyed over various networks using standard existing network protocols. In some implementations, the XML message may require translation from a proprietary format to another, more readily accessible format. In some implementations, the XML message may be processed without any translation or conversion from one format to another.

The support backbone 106 may also forward messages to third party support providers 108. Third party support providers 108 generally provide additional, outsourced, or targeted support services including software patches, service packs, data uploads, and various other system updates as requested by the system. In general, third party support providers 108 may include any external service provider having available architecture to send and receive information in the system 100 to facilitate support via the embedded modules in distributed application 114. In some implementations, the providers 108 may include support providers who do not have access to the architecture, but may instead field incident reports over the phone or through other means of communication. These providers 108 may be local or remote to server 102 so long as they can process or support one or more business objects 120 or session objects 122. For example, third party support providers 108 may receive a software update or patch from remote support module 116 and automatically apply the update to one of the services in distributed business application 114. The business application 114 may then provide the update to the front-end application in client system 104 across network 112. In another example, the remote support module 116 may automatically determine that a particular instance of business application 114 might benefit from a support service or software update from one or more third party providers 108 and may forward the recommendation to the server 102. In some implementations, the support backbone 106 may use a message to ask for clarification about a detected software incident or support service before recommending the particular third party support provider 108.

In one aspect of supporting the distributed application system, one or more generated events are selectively identified at the client 104 or server 102. Each generated event may indicate a change in an operational parameter of components of the system and is selected if the event triggers one or more predetermined logical rules. In some implementations, the one or more predetermined logical rules can include an AND, an OR, an XOR, a NOR, a NAND, or a NOT logical operation. In some implementations, one of the predetermined logical rules is an error severity threshold, where the error severity threshold is either a system failure or a message failure. For each identified event, it is then determined whether the event has an associated predefined task. Each potential incident is generally an event which is not part of standard operation of service and which causes, or may cause, an interruption to or a reduction in the quality of that service (e.g., faults, errors, malfunctions, and so forth of an IT service). Should such a potential incident be identified, system 100 automatically collects specific context or diagnostic data associated with the event, such as technical and application information, packages the context data with a problem description and severity in an incident report, and generates an incident message or service request. Then, automatic generation of an incident object these events not having an associated predefined task can be initiated.

The incident message can also be generated by an end user and may be received by the support provider where it includes user-generated input data and collected context data both characterizing a state of a computing system. Subsequently, the incident message may be assigned and routed to a local administrator (or other key user) based on the context data (e.g., using one or more attributes of the context data). The key user may then act to initiate an implementation of a solution to the incident message which optionally results in a solution message being routed or otherwise transmitted to the end user notifying him about the solution to the incident message.

The incident message may be initiated by the end user by activating one or more graphical user interface elements integrated into a software application operating on the computing system. For example, a help button may be embedded on each page presented by the software application. Activating the help button may cause a support request window or form to be presented to the end user requesting further information associated with an incident. Based on the data contained in the incident message, the local administrator 110 is assigned to and provided with the incident message. Thereafter, the administrator 110 or other key user may implement a solution to the incident message. Optionally, a solution message notifying the end user of a solution to the message may be routed to the end user. After the user-generated input (such as after the user has filled out the support request form), the specific context data may be collected.

In some cases, generation of an administrative task for each received event having an associated predefined task is initiated. The administration task is generally a single activity or a group of activities within the IT system that is performed in order to reach specific end results. Administration tasks can relate to a defined activity, such as the change of a configuration parameter, system setting, or application data. Administration tasks also can be used for incident and problem resolution, prevention (i.e., the execution of regulation maintenance steps required to help keep the IT system stable), and other activities such as parameterization, user creation, and system restart. A simple example of an administration task is a "how-to-guide," which describes an activity step by step. A more complex example of an administration task is a guided activity transaction (a "wizard"), which guides the user through the activity.

In attempting to resolve the potential incident associated with the incident message, the local administrator 110 may manually enter a proposed solution (which may occur after, for example, searching a knowledge base or utilizing a wizard tool), or it may hand off the incident message to backend system 106 (which typically resides on a remote node). The backend system 106 may, in turn, poll a knowledge base (which may be local to the backend system) to obtain one or more pre-defined solutions associated with at least a portion of the content data (e.g., an attribute). Optionally, the backend system 106 may route the incident message to a support user (e.g., an expert user) that can determine an appropriate solution to the incident message—which solution is transmitted back to the key user (or alternatively, which is automatically implemented). The incident message may be routed to the local administrator by queuing the message in a work list associated with the key user and/or by e-mailing the incident message to the key user.

Similarly, the solution message may be queued in a work list associated with the end user and/or e-mailed to the end user. After the solution message has been routed to the end user, the end user may provide feedback data confirming whether the solution resolves an incident associated with the incident message. This feedback data may be provided, for example, in another form in the graphical user interface. However, if the feedback data indicates that the incident was not properly resolved, the feedback and the data may be sent back to the local administrator (or one of the support providers) to reprocess. In some variations, each generated solution message may be stored in a local or remote knowledge base repository. The knowledge base repository may be used to identify appropriate solutions for subsequent incident messages (using, for example, attributes of the context data) for this or other instances of distributed business application 114.

FIG. 2 illustrates an example architecture of the distributed business application 114 of FIG. 1 implementing certain embedded support services. In particular, the architecture utilizes various elements for characterizing interactions that occur in the system. The elements of this architecture include various application business objects 202, process components 204, service interfaces, messages (not shown), and deployment units 212. Details of example implementations, relationships, communications, and instances are provided in FIGS. 4, 5, and 6. Generally, the business object 202 is a representation of a type of a uniquely identifiable business entity (an object instance) described by a structural model. In the architecture, processes may typically operate on business objects. Business objects 202 represent a specific view on some well-defined business content. In other words, business objects 202 represent content, which a typical business user would expect and understand with little explanation. Business objects 202 are further categorized as business process objects and master data objects. A master data object is an object that encapsulates master data (i.e., data that is valid for a period of time). A business process object, which is the kind of business object generally found in a process component, is an object that encapsulates transactional data (i.e., data that is valid for a point in time). The term business object will be used generically to refer to a business process object and a master data object, unless the context requires otherwise. Properly implemented, business objects are implemented free of redundancies.

The architectural elements also include the process component 204. The process component 204 is a software package that realizes a business process and generally exposes its functionality as services: The functionality contains business transactions. In general, the process component 204 contains one or more semantically related business objects. Often, a particular business object 202 belongs to no more than one process component 204. Interactions between process component pairs involving their respective business objects 202, process agents, operations, interfaces, and messages are described as process component interactions, which generally determine the interactions of a pair of process components 204 across a deployment unit boundary. Interactions between process components 204 within a deployment unit are typically not constrained by the architectural design and can be implemented in any convenient fashion. Process components 204 may be modular and context-independent. In other words, process components 204 may not be specific to any particular application and as such, may be reusable. In some implementations, the process component 204 is the smallest (most granular) element of reuse in the architecture. An external process component 204 is generally used to represent the external system in describing interactions with the external system; however, this should be understood to require no more of the external system than that able to produce and receive messages as required by the process component that interacts with the external system. For example, process components 204 may include multiple operations that may provide interaction with the external system. Each operation generally belongs to one type of process component in the architecture. Operations can be synchronous or asynchronous, corresponding to synchronous or asynchronous process agents, which will be described below. The operation is often the smallest, separately-callable function, described by a set of data types used as input, output, and fault parameters serving as a signature.

The architectural elements may also include the service interface, referred to simply as the interface. The interface is a named group of operations. The interface often belongs to one process component and process component 204 might contain multiple interfaces. In one implementation, the service interface contains only inbound or outbound operations, but not a mixture of both. One interface can contain both synchronous and asynchronous operations. Normally, operations of the same type (either inbound or outbound) which belong to the same message choreography will belong to the same interface. Thus, generally, all outbound operations to the same other process component 204 are in one interface.

The architectural elements also include the message. Operations transmit and receive messages. Any convenient messaging infrastructure can be used. A message is information conveyed from one process component instance to another, with the expectation that activity will ensue. Operation can use multiple message types for inbound, outbound, or error messages. When two process components 204 are in different deployment units, invocation of an operation of one process component 204 by the other process component 204 is accomplished by the operation on the other process component 204 sending a message to the first process component 204.

The architectural elements may also include the process agent. Process agents do business processing that involves the sending or receiving of messages. Each operation normally has at least one associated process agent. Each process agent can be associated with one or more operations. Process agents can be either inbound or outbound and either synchronous or asynchronous. Asynchronous outbound process agents are called after a business object 202 changes such as after a create, update, or delete of a business object instance. Synchronous outbound process agents are generally triggered directly by business object 202. An outbound process agent will generally perform some processing of the data of the business object instance whose change triggered the event. The outbound agent triggers subsequent business process steps by sending messages using well-defined outbound services to another process component, which generally will be in another deployment unit, or to an external system. The outbound process agent is linked to the one business object that triggers the agent, but it is sent not to another business object 202 but rather to another process component 204. Thus, the outbound process agent can be implemented without knowledge of the exact business object design of the recipient process component 204. Alternatively, the process agent may be inbound. For example, inbound process agents may be used for the inbound part of a message-based communication. Inbound process agents are called after a message has been received. The inbound process agent starts the execution of the business process step requested in a message by creating or updating one or multiple business object instances. Inbound process agent is not generally the agent of business object 202 but of its process component 204. Inbound process agent can act on multiple business objects 202 in a process component 204. Regardless of whether the process agent is inbound or outbound, an agent may be synchronous if used when a process component 204 requires a more or less immediate response from another process component 204, and is waiting for that response to continue its work.

The architectural elements also include the deployment unit 212. Deployment unit 212 may include one or more process components 204 that are generally deployed together on a single computer system platform. Conversely, separate deployment units 212 can be deployed on separate physical computing systems. The process components 204 of one deployment unit 212 can interact with those of another deployment unit 212 using messages passed through one or more data communication networks or other suitable communication channels. Thus, a deployment unit 212 deployed on a platform belonging to one business can interact with a deployment unit software entity deployed on a separate platform belonging to a different and unrelated business, allowing for business-to-business communication. More than one instance of a given deployment unit 212 can execute at the same time, on the same computing system or on separate physical computing systems. This arrangement allows the functionality offered by the deployment unit 212 to be scaled to meet demand by creating as many instances as needed.

Since interaction between deployment units 212 is through process component operations, one deployment unit 212 can be replaced by other another deployment unit 212 as long as the new deployment unit 212 supports the operations depended upon by other deployment units 212 as appropriate. Thus, while deployment units 212 can depend on the external interfaces of process components in other deployment units 212, deployment units 212 are not dependent on process component interaction within other deployment units 212. Similarly, process components 204 that interact with other process components or external systems only through messages, e.g., as sent and received by operations, can also be replaced as long as the replacement generally supports the operations of the original.

Services may be provided in a flexible architecture to support varying criteria between services and systems. The flexible architecture may generally be provided by a service delivery business object. The system may be able to schedule a service asynchronously as necessary, or on a regular basis. Services may be planned according to a schedule manually or automatically. For example, a follow-up service may be scheduled automatically upon completing an initial service. In addition, flexible execution periods may be possible (e.g. hourly, daily, every three months, etc.). Each customer may plan the services on demand or reschedule service execution upon request.

Data collection may be performed both manually and automatically in order to provide a service by a service data download module. To facilitate automatic collection of data, several connections to data suppliers may be provided. However, manual input may be necessary for some kinds of sessions, so the architecture also supports manual entry of data. The manual input may be combined with the automatically collected data at a later time. Data processing on the received input may be performed on the support backbone 106, or at a particular service provider's system. It may be possible to transfer data in both directions. It may also be possible for services to be provided by different delivery organizations, such as a business partner.

Turning to the illustrated embodiment; FIG. 2 illustrates an example architecture of the distributed business application 114 of FIG. 1 implementing certain embedded support services. Business application 114 may include, integrate, or reference several software modules to carry out the highly integrated support tasks for internal or external parties. For example, the illustrated software modules include the application deployment unit 212, a foundation module 214, a customer relationship management (CRM) deployment unit 216, a technical platform 218, and an IT service and application management deployment unit 220. The software modules may include one or more process components that may interact with other modules using business objects, process agents, operations, interfaces, and messages.

The application deployment unit 212 shown in FIG. 2 includes an exemplary process component 204 and exemplary application business object 202 that may be used as requested by the business application 114. For example, any available deployment unit may be invoked in this implementation. As illustrated, the foundation module 214 includes a software problem reporting process component 224 that may be used to report and collect context data in the event that an error or incident occurs in the system. The software problem reporting process component 224 includes a software problem report business object 226 that may contain a report about a particular incident in a customer system, for example. The CRM deployment unit 216 shown here includes a support request processing process component 228 for processing scheduled services. The support request processing process component 228 may include a support request business object 230 to receive update notifications, for example. As stated above, interaction between deployment units generally occurs through process components. In particular, six different text types can be used in the support request business object 230: an incident description, a reply to customer, a reply from customer, a description for external provider, a reply from external provider, and an internal note. Generally, these text types are instances of a business object. Each text type may occur several times in the business object, with the exception of the incident description text.

The technical platform module 218 shown in FIG. 2 also includes an embedded support interface 232 having access to context data 234, a system landscape directory (SLD), and an integration engine. In some implementations, the technical platform module 218 may also include a software lifecycle manager (SLM) 219. The IT service and application management deployment unit 220 shown here includes a system administration process component 230 containing an administration task business object 240, a service delivery processing process component 242 containing a service delivery 244 business object, and an IT change management process component 246 containing a software change business object. Various interfaces, operations, and process agents are also included in the illustrated embodiment and will be discussed as the process component interactions are described below.

The architecture illustrated in FIG. 2 also includes a service provider having a business backbone 106 that may be communicatively connected to third party support providers 108, as well as other remote systems. The business backbone 106 may include knowledgebase data and employ one or more high-speed transmission paths in network 112 to transmit data. As illustrated, the business backbone 106 includes an integration engine 253 for receiving downloaded services and transmitting them to the service delivery system. The business backbone 106 also includes a service request processing at external service request processing process component 254 that may perform support service delivery in the system as one or more business applications request support services. As such, the service request processing at external provider process component includes a CRM service request business object 256, a service plan business object 258, and an installed base business object 260, one or all of which may perform support services and process data in the system.

The architecture may optionally include a user interface module with one or more help processors that may have access to several help databases and service information. For example, the help processors may invoke help desk services through support buttons or triggers located in the technical platform. In general, several user interfaces can trigger embedded support services. For example, an application user interface may trigger an update service when the application version becomes outdated. In this example, the application user interface may trigger the support, which may then invoke a context collection infrastructure to generate a software problem report using software problem report business object 226.

The architecture illustrates a flow of data that may be carried out in the system 100, for example. In general, the business application 114 may provide support functionality in one or more user interface screens. For example, a create support request control may be available and selectable in the user interface. A user may select the create support request control to receive support. Specifically, the user may be working in a business application having access to application business object 202 and may request support. When support is triggered, the embedded support interface 232 calls the business object 202 to retrieve information for resolving a particular incident. For example, the embedded support interface 232 may request content in the business object 202 and compare that to context data 234 to assess the particular issue that prompted the support request. The embedded support interface 232 may then create a software problem report by invoking the software problem reporting process component 224. In some implementations, the report may be created concurrently with the analysis.

Next, the software problem reporting process component 224 may create a support request using the support request and transmit the request to the support request processing process component 228. The support request processing process component 228 may then provide an interface to the external service request processing process component 254 for forwarding support requests. If the incident is solved by the external process here, a confirmation message may be sent back to the integration engine 238. Alternatively, the incident may be detected by a health check module 262. The health check module 262 may automatically observe the system and address potential issues proactively. If the health check module 262 detects an incident, a software problem report may also be created. In general, health check interface 262 may detect an event that requests administrator activity. In this example, the system administration process component 238 may receive an administration task 240 to perform. In the event that an administration task is provided to an external service provider, the external service provider may solve or complete the task and send a confirmation back to the business application 114.

The service delivery processing process component 242 provides an interface to external service processing for sending and receiving service data. The software change business object 248 may control the service packs and patches received as service data. Service packs and patches may be applied to the software through the software lifecycle manager (SLM) 219. In general, externally presented service packs and patches may be downloaded from a software download area 264. The IT change management process component 246 may provide an interface to external service processing for receiving update recommendations. In addition, the IT change management process component 246 and the support request processing process component 228 may be linked by an interface that allows the creation and the confirmation of a software change directly from the support request business object 230. In some embodiments, the system landscape directory (SLD) 236 may be the central data store for configuration regarding the software and hardware landscape in the system. The health check interface 262 and the software lifecycle manager interface 219 may retrieve data from the system landscape directory 236.

In some embodiments, support requests may include a severity field. The severity field notes the importance of a support request from the requestor's side. Typically, the severity field is completed by the end user in the support request user interface using previously defined fixed codes. The fixed codes may be accessed from the software problem report business object 226. The severity field is sent to the support request business object 230 and therefore, is part of the service request message. During the processing, the severity can be changed by the requestor.

In some embodiments, support requests may include a priority field. The priority field notes the importance of a support request from the processor's side. When the support request is created, severity field and priority field are typically filled with the same value. During the processing of the request, the processor may change the priority field. For example, if the support request is sent internally, the priority is sent internally as well. FIG. 2 is an exemplary method to deliver embedded services in a business application. Thus, some, all or none of the components may be used to delivery embedded services in the business application.

Figure 3:
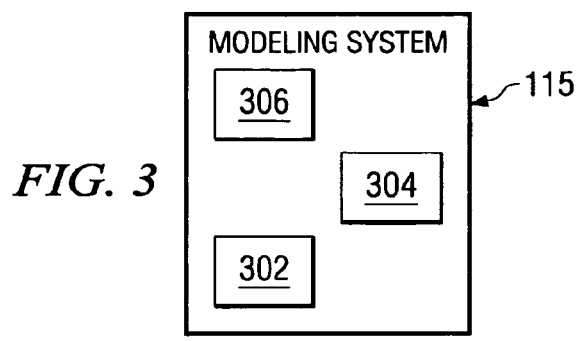
FIG. 3 illustrates example components of a modeling system for working with the distributed business application of FIG. 1 implementing certain embedded support services.

FIG. 3 illustrates exemplary components defined in a modeling system 115, which generally allows developers to model services, objects, or other parts of application 114. While described separately, modeling system 115 may be part of or supported in place of application 114 and any use of "distributed application" can include the "modeling system" as appropriate. The modeling system 115 generally includes a modeling module 302, an interactive graphical user interface (GUI) module 304, and design parameters module 306 associated with a given model (or business process). The modeling module 302 may store one or more models and associated information. By way of illustration and without limitation, the modeling module 302 can incorporate one or more files, databases, services, combinations thereof, or other suitable means for providing persistent storage of information associated with the model. In some implementations, settings and configurations associated with a business process running on a client system may be available through the modeling module 302. The GUI module 304 allows a user to create, inspect and modify a model. The GUI module 304 can present a model in different views offering differing levels of detail. This allows a user to focus on information that is appropriate to his role or task at hand. The design parameters module 306 coupled to the GUI module 304 may provide one or more processor components as tools for modifying and manipulating a model or models, as will be discussed in greater detail below.

Regardless of the particular hardware or software architecture used, business application 114 is generally capable of more easily supporting various business processes by implementing or providing various integrated and often embedded support services or modules. The following descriptions of flowcharts focus on the operation of application 114, or one of its support components or sub-modules, in performing one of the respective methods or processes. But system 100 contemplates using any appropriate combination and arrangement of logical support elements implementing some or all of the described functionality. The architectural design is a specification of a computer software application and elements of the architectural design can be implemented to realize a software application that implements an end-to-end process.

Figure 4A:
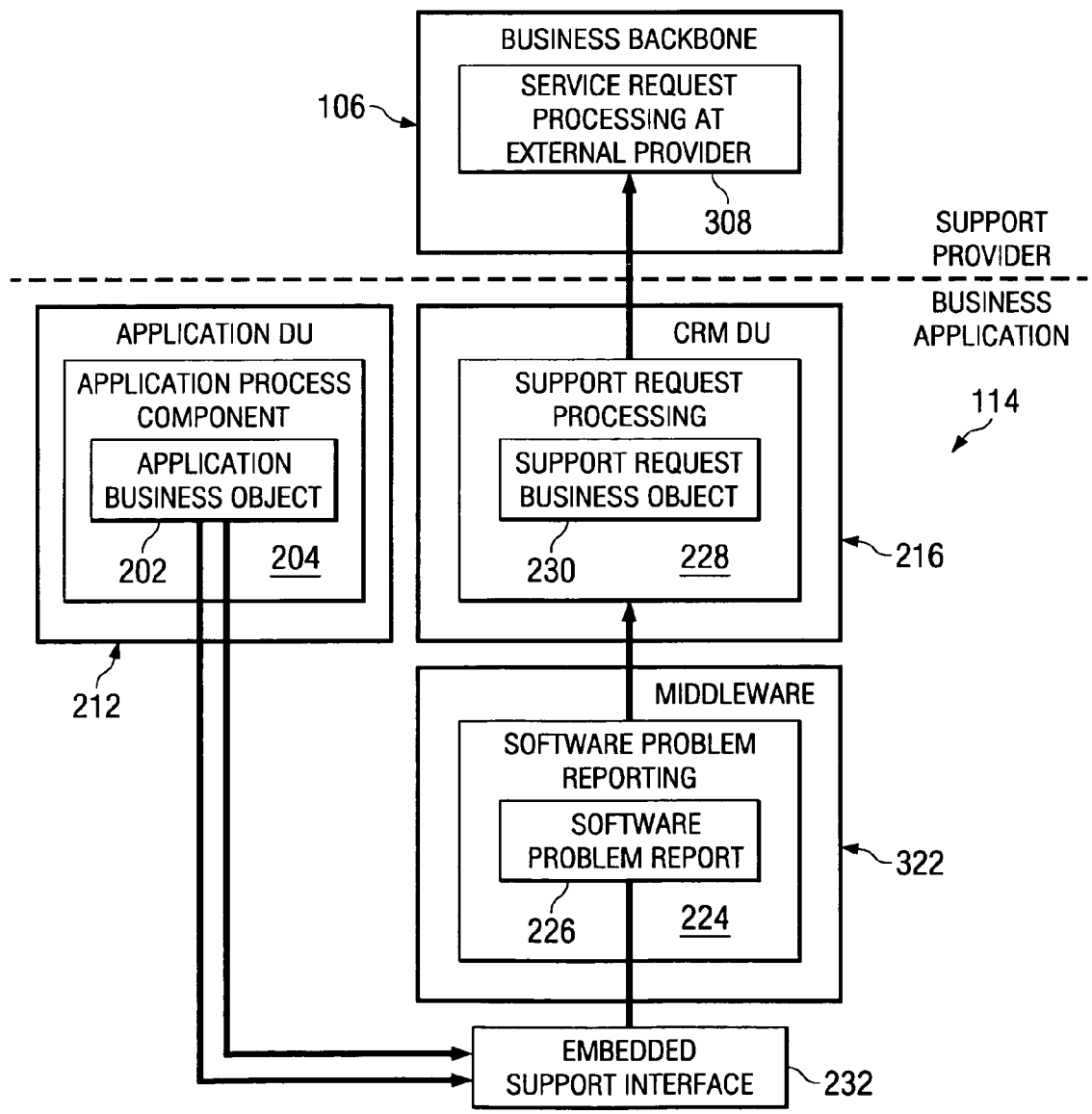
FIGS. 4A-B are example data flow diagrams among various embedded services and the remote support module of FIG. 1.
Figure 4B:
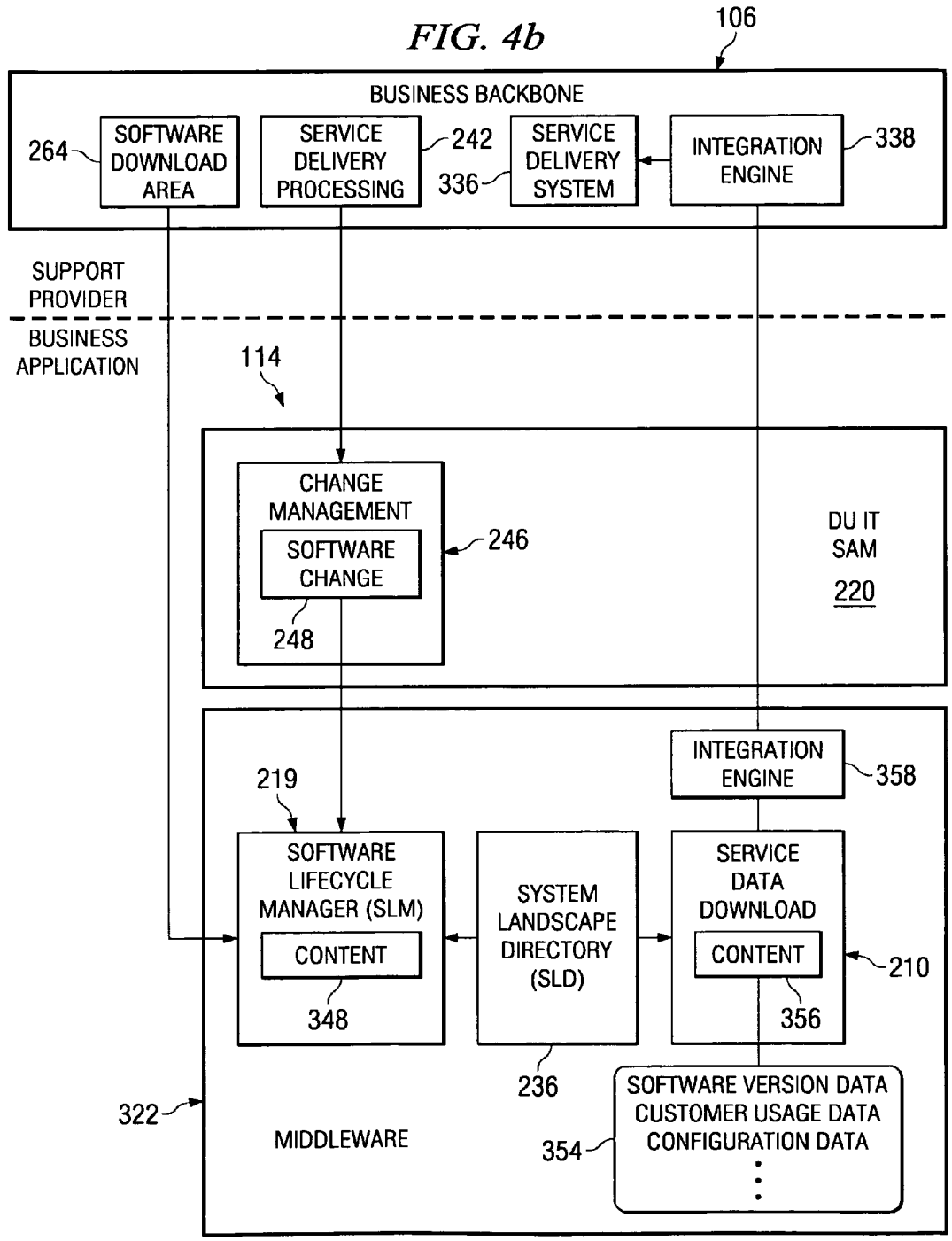

FIGS. 4A-B are example data flow diagrams among various embedded services and the remote support module of FIG. 1. Generally, the methods shown in the flow diagrams describe automatically identifying a particular support recipient and delivering embedded services to the identified support recipient. In some implementations, the methods may be implemented by computer hardware and software within an enterprise computing system, such as the computing system that is shown as part of FIG. 1.

The architecture illustrated in FIG. 4A includes a service provider or backbone 106 and a business application 114 that may be communicatively connected to third party support providers 108 and other remote systems. The business backbone 106 may include knowledgebase data and employ one or more high-speed transmission paths in network 112 to transmit data. For example, several smaller networks may directly connect an end user or customer to the business backbone 106. As illustrated, the business backbone 106 includes a service request processing at external provider process component 308 that may perform support service ordering and billing in the system 100 as one or more business applications request or need support services.

The business application 114 may include one or more application deployment units 312, each of which may include one or more application process components 204 that may, in turn, create, modify or delete an instance of one or more application business objects 202. For example, a customer relationship management deployment unit 216 may include a support request processing process component 228 to process scheduled services. The support request processing process component 228 includes a support request business object 230 to receive update notifications. For example, the support request business object 230 may receive update notifications from other processing components in the system 100 as services are deployed.

The illustrated business application 114 also includes middleware 322 where various applications can be built to integrate business processes and databases across a number of sources using web services, for example. As illustrated, the middleware 322 includes a software problem reporting process component 224 that may be used to report and collect context data in the event that an error or incident occurs in the system 100. The software problem reporting process component 224 includes the software problem report business object 226 that may contain a report about a particular incident in a customer system. The report may be triggered either by an end user or by the support provider. The software problem report business object 226 may also include information about a person, system or context data of a particular incident. In general, the software problem report is used to initiate a support request at a service desk or third party support provider 108.

In operation, a user (through a user interface), a process agent, or an application service may create or request creation of an incident in one or more application business objects 202. An embedded support interface 232 may receive the incident context data, such as when the incident occurred and other details pertinent to resolving the incident. Next, the embedded support interface 232 may be connected to the middleware 322 where the software problem report business object 226 can be instantiated and/or updated with incident context data. The context data may be sent to the support request processing process component 228 where the support service may be scheduled. An incident may receive a solution from a customer service desk, or alternatively, may be forwarded to an external provider system process component 308 in the business backbone 106. For example, incidents may be forwarded to an external provider when they cannot be solved by the customer's service desk or the customer has a specific support agreement for first level support. In some implementations, after the incident is resolved, a message may be transferred back to the support request processing process component 228 to update the component about the resolution.

FIG. 4B shows an example cycle of a service update occurring for an IT service and application management deployment unit 220. In general, the IT service and application management deployment unit 220 may contain entities that are used for operating and servicing a system. In some implementations, the IT service and application management deployment unit 220 may be deployed on a separate system or functions within the deployment unit 220 may be outsourced to an external service provider. Here, the IT service and application management deployment unit 220 includes a change management process component 246 that may control changes to an IT infrastructure in a well-defined manner, thus enabling approved changes with minimum disruption, such as downtime or manual follow-up activities. The change management process component 246 includes a software change business object 248 that may notify a user of a recommended maintenance package (patch, update, or continuous change package) for a particular system. In general, the software change business object 248 may control process steps and may guide an administrator through possible manual actions. In this example, the business backbone 106 includes a service delivery system 336, an integration engine 338, and a software download area 264. The service delivery system may transmit update recommendations to change management process component 246. The integration engine 338 may receive service data and transmit them to the service delivery system 336 in the business backbone 106.

Figure 5A:
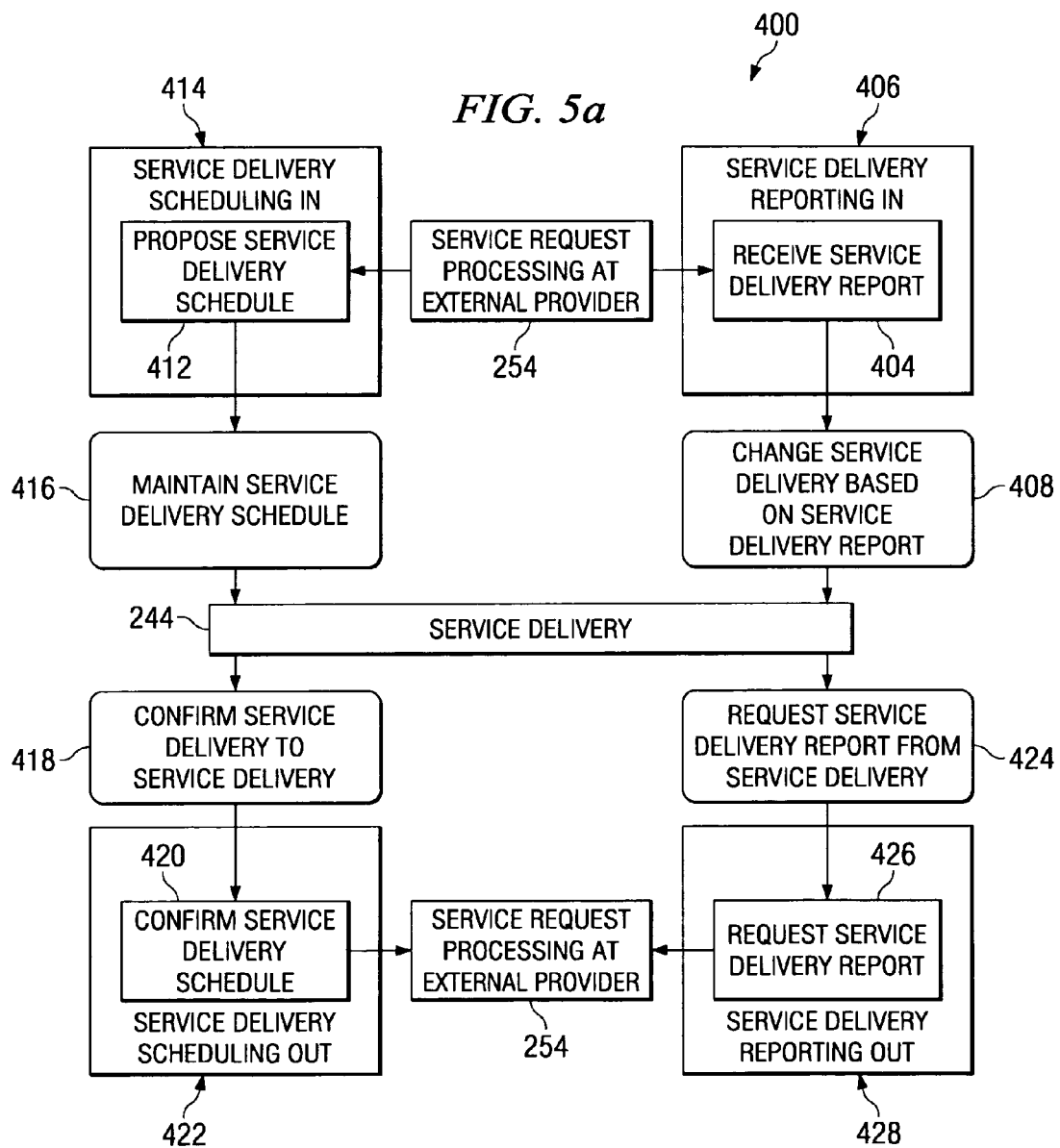
FIG. 5A is a flowchart illustrating an example method implemented by a service delivery processing process component.

FIGS. 5A-D are flowcharts illustrating example techniques implemented by the previously illustrated process components. FIG. 5A is a flowchart illustrating an example method implemented by the service delivery processing process component 242. Generally, the method 400 describes a process component model used to schedule and deliver a service in an internal or external computing system. Illustrated method 400 may begin, for example, when a business backbone system 106 identifies the need or advantage of a delivery of a service in the business application 114. This identification may occur automatically using any suitable technique or based on a request, selection, or other indication by a user. For example, the business backbone system 106 may determine the benefit (or need) of data archiving in the business application 114. The service request processing at external provider process component 254 in the business backbone system 106 may send a service schedule proposal to the service delivery processing process component 242. The service delivery processing component 242 may also control the service scheduling, service execution and the feedback process to the service provider. In addition, the service delivery process component 242 may support a mass-service delivery with minimal administration for customers. Example services may include monitoring, archiving, or upgrading customer applications and systems.

In operation, the service delivery processing process component 242 may receive a service delivery schedule proposal and perform a receive function using a propose service delivery schedule operation 412. For example, the service delivery schedule proposal may be a proposal to deliver a remote archiving service at a customer site. The propose service delivery schedule operation 412 is included in a service delivery scheduling in interface 414. Once the delivery schedule is proposed, a maintain service delivery schedule asynchronous inbound process agent 416 may update the service delivery business object 244 with the proposed schedule.

The service delivery business object 244 is included in a service application management deployment unit. The service delivery business object 244 may be described as a recording of a service provided by a service provider from the viewpoint of a customer, who is the receiver of the service. Service scope, scheduling, results, and confirmation can be documented within the service delivery business object 244.

After proposing a schedule for the service, the service delivery business object 244 may use a confirm service delivery to service delivery outbound process agent 418 to invoke a confirm service delivery schedule operation 420. For example, the operation 420 may send a request for confirmation of the proposed schedule to the customer. The service delivery schedule operation 420 is included in a service delivery scheduling out interface 422.

Before the service schedule date, the service delivery business object 244 will automatically collect data that are required for the service delivery. After the necessary service data are collected in the system, a request service delivery message from service delivery outbound process agent 424 may invoke a request service delivery report operation 426 to request a service delivery report from the service provider. The request service delivery report operation 426 is included in a service delivery reporting out interface 428. Both operations 420 and 426 may update the Service Request Processing at External Provider process component 254 with confirmation or request information, respectively.

Once the service delivery report is received, a change service delivery based on service delivery report asynchronous inbound process agent 408 may update a service delivery business object 244 by adding a service delivery report. The service delivery report may contain recommendations for a step-by-step execution of a service in the customer system as well as executable code that executes the service.

Figure 5B:
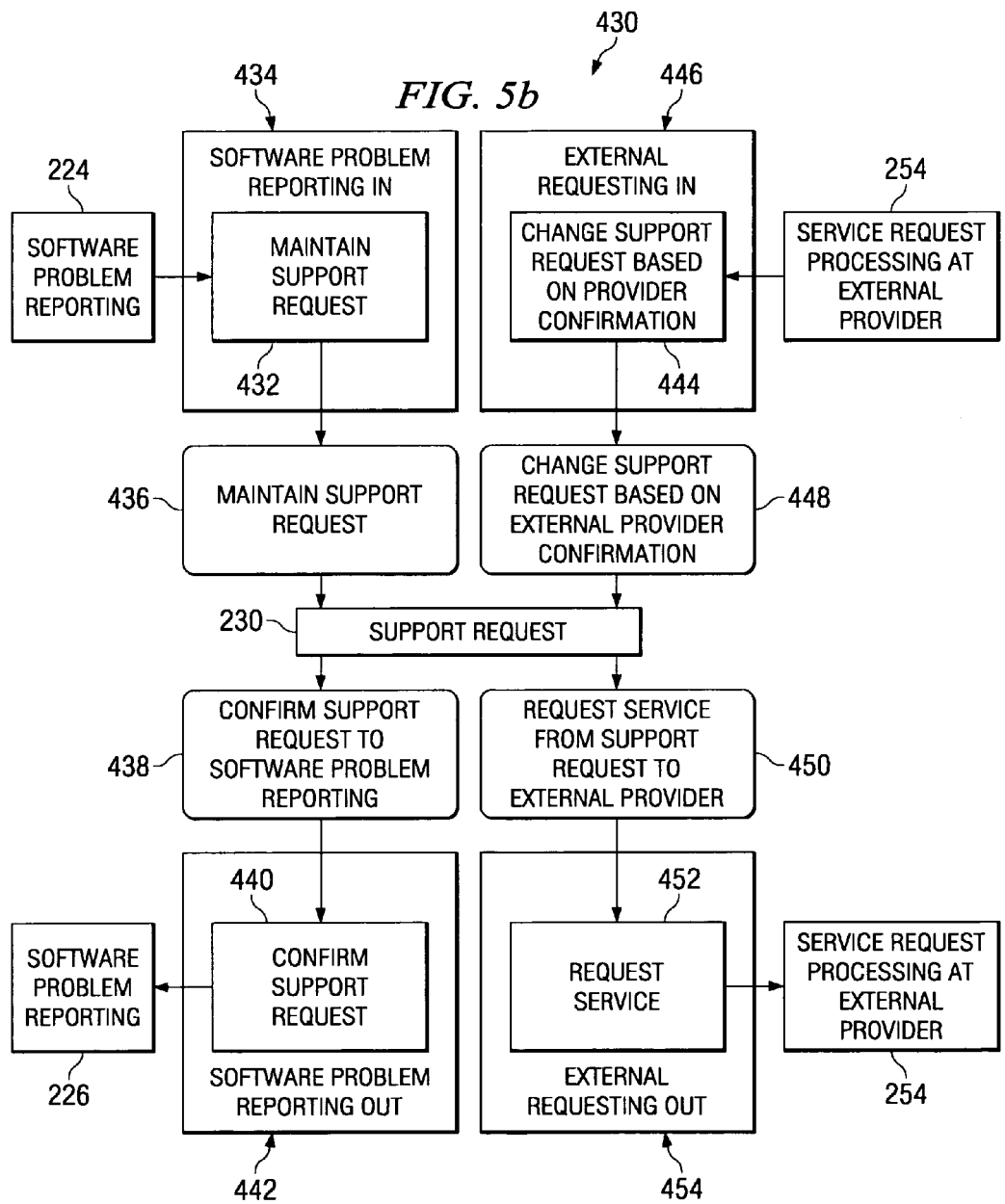
FIG. 5B is a flowchart illustrating an example method implemented by a support request processing process component.

FIG. 5B is a flowchart illustrating an example method implemented by a support request processing process component 228. Generally, the method 430 describes a process component model used to report a software problem or incident, and to request a service to resolve the reported software problem. Illustrated method 430 begins, for example, when a software incident is detected in the software problem reporting process component 224. The received incident may invoke a maintain support request operation 432 to communicate (via a message) collected system data about the incident to the support request business object 230. The maintain support request operation 432 is included in a software problem reporting in interface 434. A maintain support request asynchronous inbound process agent 436 may update the support request business object 230 with collected system data. In addition, the inbound process agent 436 may check the message content and the message type, map service request message data to the support request business object 230, call services for creating or updating and saving the support request, and trigger the event to send a message back as a support request confirmation.

Once the system data has been collected and the support request business object 230 has been updated, a confirm support request to software problem reporting outbound process agent 438 may invoke a confirm support request operation 440 to send a confirmation message. The confirm support request operation 440 is included in a software problem reporting out interface 442. In particular, the operation 440 may update the software problem reporting process component 224 with a confirmation message;

The method 430 may also request and obtain services from an external provider using the service request processing at external provider process component 254. When a support request is received from a customer that cannot be executed and resolved internally, a modification may be made to the support request by invoking a change support request based on provider confirmation operation 444. The confirmation operation 444 is included in an external request in interface 446. The confirmation operation 444 may use a change support request based on external provider confirmation asynchronous inbound process agent 448 to check if the external provider supplied an external ID for the support request. If the inbound process agent 448 does not receive an external ID, an action log in the support request business object 230 may be updated identifying that the request was rejected by the external provider. If the external ID is received, the inbound process agent 448 may call for the requested service and update the support request business object, accordingly.

To call for the requested service, the support request business object 230 may use a request service from support request to external provider outbound process agent 450. When the support request is sent to an external provider, the identification of the recipient of the service may be automatically identified through context data collected, such as buyer and seller identification numbers. Messages containing context data in XML format for example, may be sent or forwarded to the external provider system with a support request. The request service from support request to external provider outbound process agent 450 may request a service by invoking a request service operation 452. The request service operation 452 is included in an external requesting out interface 454. The request service operation 452 may update the service request processing at external provider process component 254, as well as send messaging to lifecycle and processing states to define a new action for the states.

FIG. 5C is a flowchart illustrating an example method implemented by the software problem reporting process component 224. Generally, the method 460 describes a process component model used to modify a software problem report and request the modified support. The method 460 begins, for example, when a support request processing process component 228 receives an indication from a user system to modify a previously requested support service. A change software problem report operation 462 may be invoked to modify the initially reported software incident. The software problem report operation 462 is included in the software problem reporting in interface 434.

The actual modification may be carried out and updated in the software problem report business object 226 using a change software problem report based on confirmation asynchronous inbound process agent 464. Upon receipt of the modification, the software problem report may use a service request form to request processing outbound process agent 466 to invoke a request support operation 468. The request support operation is included in the software problem reporting out interface 442. Upon requesting the modified support, the request support operation may send a message to the support request processing process component 228 with an update or further instruction.

FIG. 5D is a flowchart illustrating an example method implemented by a change management process component 246. Generally, the method 470 describes a process component model used to update a software change business object 248 with one or more software patches. The method begins when the service delivery processing process component 242 receives a notification to initiate a software change. A maintain software change operation 472 may be invoked to send a message about implementing the software change. The message received at the process component 242 may include update recommendations for a particular user system. For example, the support backbone 106 may automatically collect system context data associated with a customer's hosted application. The support backbone 106 may then communicate the collected system context data to a remote support module in a previously specified protocol and additionally may collect specific context data to identify the customer and the one or more issues present in the hosted application. Once the issues have been identified, method 470 may use a create software change based on update recommendation notification asynchronous inbound process agent 476 to notify the software change business object 248 about the change. The software change business object 248 may use the collected system and specific context data to execute a resolution to the customer issue. The following interaction diagrams 6A-6D detail the processes that may occur when a software change is requested in the system. In particular, the diagrams illustrate the interaction between the various process components in the architecture.

FIG. 6A is a block diagram showing the interactions between the support request processing process component 228 and a service request processing at external provider process component 254. The support request processing process component 228 covers requests from a customer to a service provider to answer a question or solve a support incident about a product that the customer may possess. The goal is generally to solve the support incident as quickly as possible, for example, internally at a customer service desk, or alternatively, by routing the incident to an external provider.

The support request processing process component 228 includes the support request business object 230. The support request business object 230 is a request to resolve an incident in the operations of an IT solution. The request may be triggered by an end user or a service provider's system. The support request business object 230 may allow documentation of a support incident, a resolution process, or solutions found to the incident. The business object 230 may typically include requestor data, the nature and context data of the incident, a description of a symptom, attributes that classify the incident, reasoning, severity and other classification information. In addition, the support request business object 230 may enable appropriate reaction, prioritization, and scheduling of support request processing.

In operation, the support request business object 230 may send a request for service to a request service operation 508. The operation 508 is included in an external requesting out interface 504. The operation 508 may send service request creation or update data to an external provider system by generating a service request message 510 to update the service request processing at external provider process component 254.

When the incident has been solved by the external provider or additional information has been requested from the customer service desk to solve the issue, the support request processing process component 228 may receive an inbound service request confirmation message 512 from the service request processing at external provider process component 254. In general, both the external provider and the customer service desk may send a message to one another. For example, a customer may send a message to update the external provider or the service desk about the incident. The messages generally do not modify the status of the support request business object 230.

Next, an external requesting in interface 514 receives the service request confirmation message 512 and invokes a change service request based on provider confirmation operation 516 that updates a service request based on a confirmation message of a service request creation, update, or processing progress received from a particular external provider system. A change support request based on external provider confirmation inbound process agent 518 updates the support request business object 230.

FIG. 6B is an example diagram showing the interactions between the software problem reporting process component 224 and the support request processing process component 228. Generally, the support request processing process component 228 may be used to process an incident created in the software problem reporting process component 224. Incidents are typically reported as software problem reports in a customer's local system; however, the processing of the incidents may be performed in the central support request processing process component 228.

As shown, the software problem report business object 226 can be instantiated in the software problem reporting process component 224 when an incident is identified, or alternatively, support is requested for an identified incident. The software problem report business object 226 may use a request support from software problem reporting outbound process agent 520 to invoke a request support operation 468. The request support operation 468 may request specific services to resolve the incident. The operation 468 is included in the software problem reporting out interface 442. As shown by node A, requesting support may generate the service request message 510 to be sent to the support request processing process component 228. Upon receipt of the service request message 510, the maintain support request operation 432 in the software problem reporting in interface 434 may update the support request business object 230. For example, the maintain support request inbound process agent 436 may check the message content and the message type, map service request message data to the support request processing business object 230, and call a particular service to create, update, or save the support request.

The support request business object 230 may then use the confirm support request from external provider outbound process agent 550 to invoke a confirm support request operation 440. The confirm request for quote operation is included in the software problem reporting out interface 442. As shown by node B, the service request confirmation message 512 may be generated and sent back to the software problem reporting process component 240 where it may invoke the change software problem report operation 462. The operation 462 is included in a software problem reporting in interface 434. The change software problem report operation 462 may use a change software problem report based on confirmation inbound process agent 464 to update the software problem report business object 226.

FIG. 6C is a block diagram showing the interactions between the service delivery processing process component 242 and the change management process component 246. The service delivery processing process component 242 may receive a recommended update from the third party support provider 108 or other external system and generate an update recommendation notification message 530. The update recommendation notification message 530 may then be sent to the change management process component 246, thus invoking the maintain software change operation 472 in the update recommendation in interface 474. The operation 472 may make the recommended software change and use the create software change based on update recommendation notification inbound process agent 476 to update the software change business object 248. For example, the update may include a description of the change recommended, such as software patch or update details.

Figure 6D:
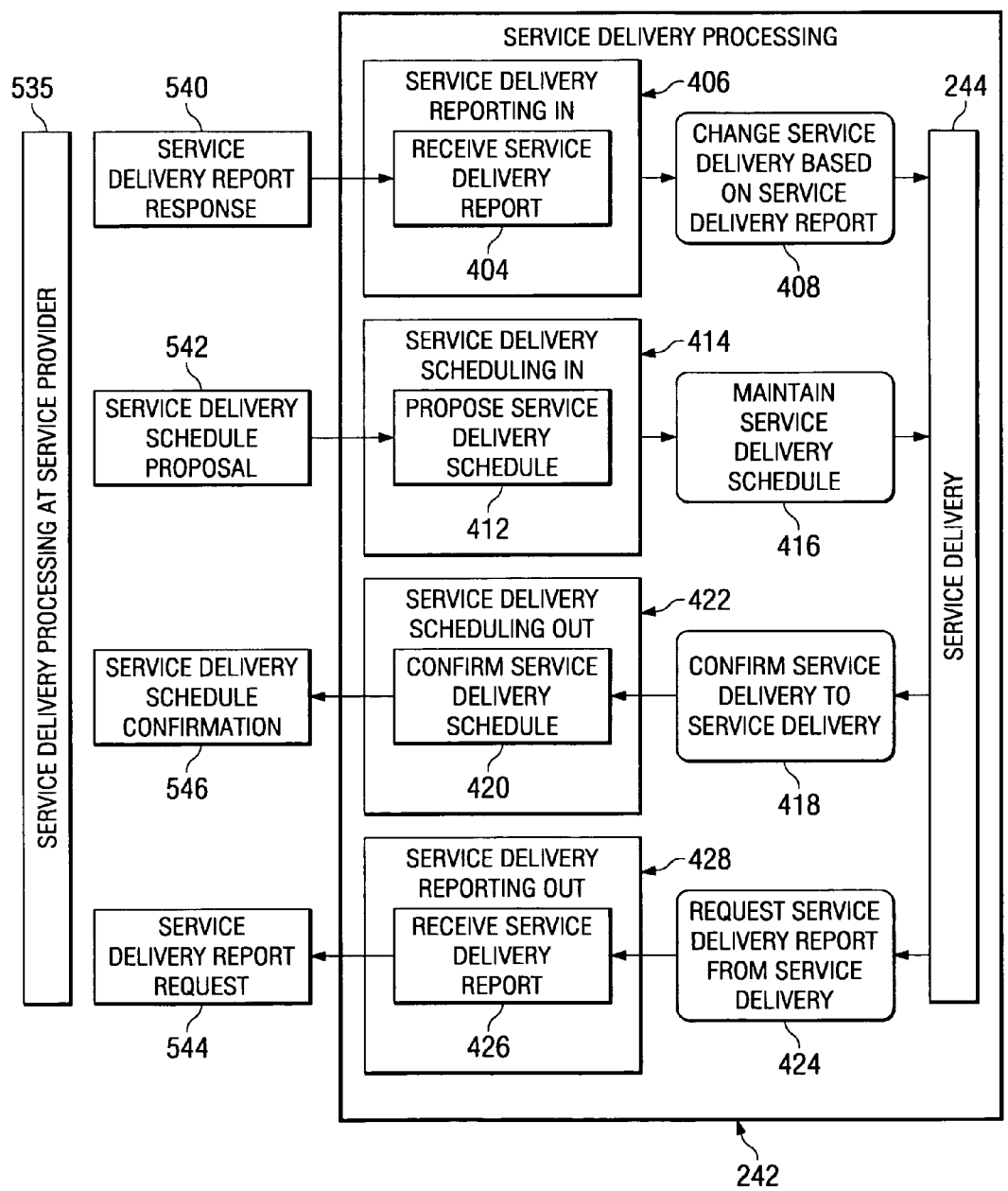
FIG. 6D is a block diagram showing the interactions between the service delivery processing process component at service provider process component and the service delivery processing process component in accordance with one embodiment of FIG. 2.

FIG. 6D is a block diagram showing the interactions between the service delivery processing at service provider process component 535 and the service delivery processing process component 242. The service delivery processing at service provider processing component 535 may generate a service delivery report response message 540 or a service delivery schedule proposal message 542 for receipt in the service delivery processing process component 242.

In the event that the service delivery report response message 540 is generated, a notification may be received in the service delivery reporting in interface 406. The service delivery report operation 404 may be invoked from here. The receive service delivery report operation 404 may use a change service delivery based on service delivery report inbound process agent 408 to update the service delivery business object 244. Upon receipt of the service delivery update, the service delivery business object 244 may send the updated information received in the request service delivery report using the request service delivery report from service delivery outbound process agent 424. The service delivery reporting out interface 428 may receive the update and the request service delivery report operation 426 may be invoked. The operation 426 may then create and send the service delivery report request message 544 back to the service delivery processing at service provider process component 535.

In the event that the service delivery schedule proposal message 542 is generated, a notification may be received in the service delivery scheduling in interface 414. Next, the proposed service delivery schedule operation 412 may be invoked and the schedule proposal may be sent to the service delivery business object 244. For example, the maintain service delivery schedule inbound process agent 416 may be used to deliver the schedule proposal. Upon receipt of the proposed schedule, the service delivery business object 244 may use the confirm service delivery to service delivery outbound process agent 418 to invoke the confirm service delivery schedule operation 420. The operation 420 is included in the service delivery scheduling out interface 422. Operation 420 may create and send the service delivery schedule confirmation message 546 to the service delivery processing at service provider process component 535.

Figure 7:
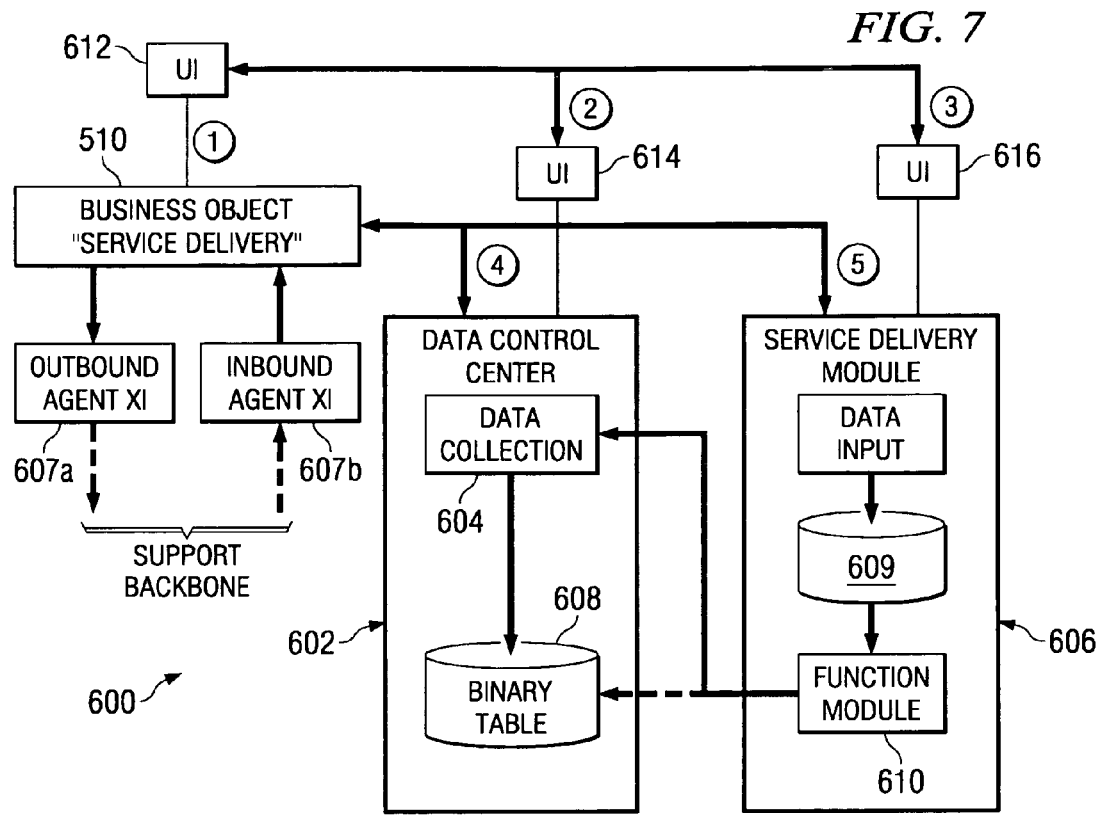
FIG. 7 illustrates an example service delivery business object and certain interfaces to example components.

FIG. 7 illustrates an example service delivery business object and certain interfaces to example components. Specific interactions 600 that may occur in the service delivery business object 410 are shown. Each time a service session is invoked, an instance of the service delivery business object 410 may be created. The instances may interact with a data control center 602 using a data collection module 604 and a service delivery module 606 for the execution of a service. The service delivery business object 410 may use outbound agents 607a and inbound agents 607b to do business processing involving the sending or receiving of messages.

The data control center 602 may provide framework for scheduling, data collection, maintaining and monitoring execution of services. One or more data repositories may be included in the data control center 602. For example, a binary table repository 608 may house data, such as delivery dates and part numbers, in binary format.

The service delivery module 606 may be used for performing manual steps in a service session (e.g., the input of data by a customer or a service consultant). The service session may be one of several (usually remotely performed) analyses that make up a particular embedded service. Each service session may have a specific objective and result in an extensive report with a detailed actions list and recommendations. Typically, a session may be the instance of one service.

Report data may be combined with the data collected automatically via the data control center 602. Generally, combining the data may occur in binary tables 608. In some implementations, data may be combined in a repository 609 in the service delivery module 606. In certain cases, the service delivery module 606 may invoke a function module 610 to perform the combination function. The function module 610 may call the data collection module 604 to retrieve the binary table data or, alternatively, may connect directly to the binary tables 608.

A user may manually navigate from a user interface 612 of the instantiated business object to another user interface (614 or 616) to gain access to the data control center 602 and the service delivery module 606. In some implementations, the service delivery business object 410 may connect directly to the data control center 602 and the service delivery module 606 without using a user interface to obtain service data.

Other interactions may occur in the service delivery business object. For example, the session may be forwarded to a new processor leaving the data control center 602, service delivery module 606 and any associated user interfaces unchanged. As another example, a user may select a link to view the download status of a particular service. In some implementations, the service delivery business object 410 may request the data control center to begin a download session. A user may also view session details and while doing so may choose to enter the user interface 616 to perform manual checks on a session that may request user input. In some implementations, after a service is ordered, a session may also be created in the service delivery module 606. This may be done through direct communication between the service delivery business object 410 and the service delivery module 606 without involving a user interface.

In some implementations, a list of guided procedures may be generated to deliver a service to a client rather than utilizing the service delivery module 606 to automatically deliver services. However, the process may be more manual and complex and may include more supervision to carry out properly. Furthermore, text editing and translation, versioning, transport mechanisms, and other services may be done manually when using guided procedures.

Figure 8:
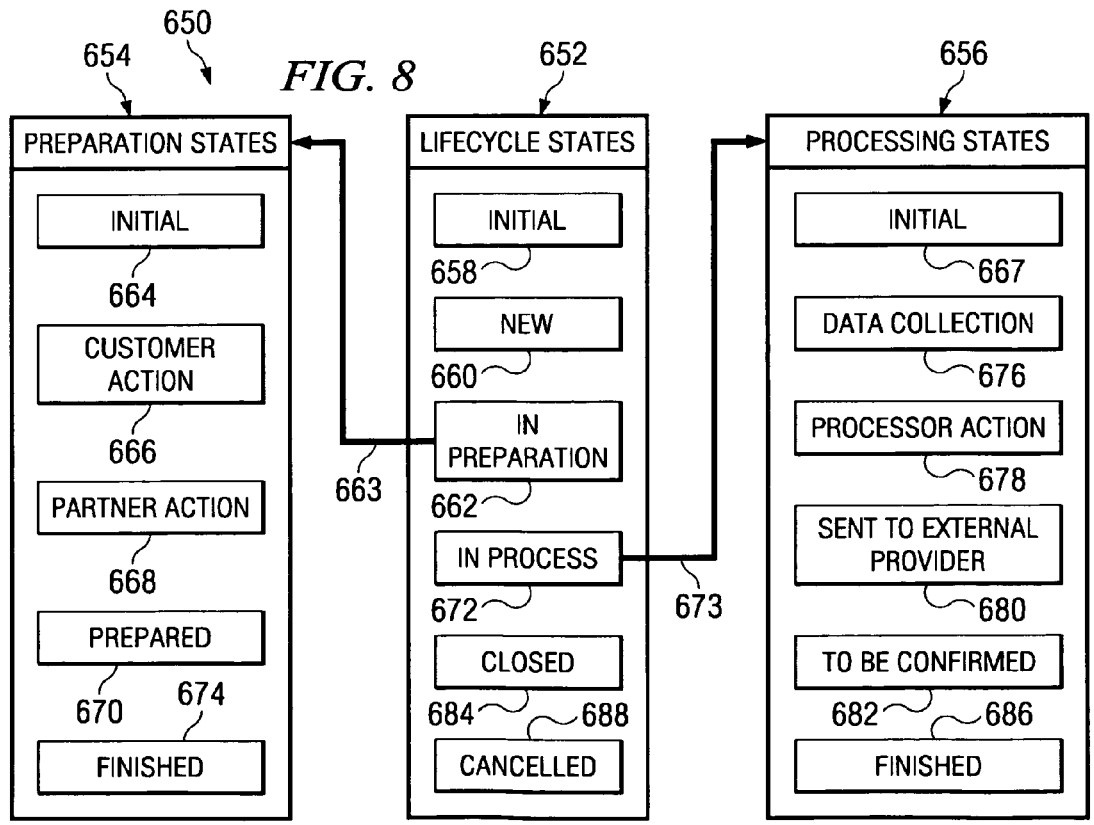
FIG. 8 is a block diagram illustrating an example life cycle of an embedded service session object.

FIG. 8 is a block diagram illustrating an example life cycle 650 of an embedded service session object 122. The embedded service session object 122 may be associated with a business object 120, such as the service delivery business object 244 from FIG. 6D. As shown in the life cycle 650, the service session object 122 may be assigned to several states throughout its life cycle. Generally, the states of the service session object 122 may be divided into three groups: lifecycle states 652, preparation states 654, and processing states 656. Therefore, when describing a particular status of the object, a single state, such as "initial," may be used or, alternatively, several levels of the state may be used, such as "new/initial/initial" to denote that the state of the session object is "new" in the lifecycle 652, "initial" in the preparation states 654, and "initial" in the processing states 656.

The lifecycle states 652 may be categorized into several status levels. The lifecycle states 652 include an initial state 658, a new state 660, an in preparation state 662, an in process state 672, a closed state 684, and a cancelled state 688. The service session may be in the initial state 658 when a new instance of a particular business object is created, such as the service delivery business object 410. The initial state 658 is the first step in the lifecycle of a service session and can be done automatically by an incoming message or manually by a self service for service creation, for example. As mentioned above, the embedded service session object may represented by the service delivery business object 410, thus when creating the service session, a new instance of the business object 410 will be created.

Upon instantiation, service data may be analyzed automatically. Generally, this is the first action of the life cycle. Depending on who created the session and if a session date was provided, the instance will be in one of several states (e.g., "new/initial/initial," "in preparation/customer action/initial," "in preparation/partner action/initial," or "in preparation/prepared/initial"). For example, the instance may be assigned to the new state 660, if the analyzed service data does not include a service date. The new state status may be reached by analyzing received service data. Once a service session is in the new state 660, a customer or partner may schedule a service session using the received service data.

Alternatively, the service data may include a session date by means of a proposal from a customer or a partner. In this example, the service session may be assigned the in preparation state 662 status. As shown by an arrow 663, the life cycle 650 may continue to evolve through more detailed preparation states 654. While in the preparation states 654, the service session may be assigned to an initial preparation state 664 while awaiting customer or partner actions. For example, customer or partner actions may include scheduling or rescheduling of a service session. The status of the instance may change to "in preparation (662)/customer action (666)/initial 667" to indicate that the lifecycle state 652 is in preparation 662, the preparation state 654 is customer action 666, and the processing state is initial 667. Specifically, the state may indicate that a particular partner is rescheduling an already confirmed session and expects a customer action, such as confirmation. Similarly, the status of the instance may change to "in preparation (662)/partner action (668)/initial (667)" to indicate that the lifecycle state 652 is in preparation 662, the preparation state 654 is partner action 668, and the processing state is initial 667. Specifically, the state may indicate that a particular customer is scheduling the session or rescheduling an already confirmed session. In some implementations, the scheduling or rescheduling of a service session is an optional step.

When a particular action is requested, either the customer or the partner may confirm the scheduled date depending on the requested action. After confirmation of the session date, the status changes to "in preparation (662)/prepared (675)/initial (667)" and the service session may be created and/or scheduled. For example, the service session may be created or scheduled within a service delivery workbench software application. After the service session is scheduled, the status changes to "in process (672)/finished (674)/initial (667). As shown by an arrow 673, the life cycle 650 may continue to evolve through more detailed processing states 656. In some implementations, the confirmation of a service session is an optional step. In certain cases, a session date may be determined regardless of customer or partner interaction. In yet other implementations, a confirmation may not be required to begin a session. In one example, the service session may belong to a group of sessions. Here, the elements for previous and/or following sessions of the new instance typically refer to the according instances. In this example, the elements of the corresponding sessions are generally updated accordingly.

Next, the service session may automatically begin to collect data. For example, the automatic download of data may occur by means of a service data control center. The status of the service session changes to "in process (672)/finished (674)/data collection (676)." In general, the data download is performed asynchronously. When it is finished, the data can be preprocessed. In some implementations, the download of data may be done manually, or depending on the kind of session, the manual processing can occur after automatic processing. In other implementations, collected data may be directly sent to the backbone 106. In certain implementations, collected data may be sent to an external third party provider 108. In some implementations, the collection and/or download of data is an optional step.

If data has been downloaded, a user, such as a customer or service consultant, may perform manual verification on the session. If a user chooses to manually verify data, the session status is changed to "in process (672)/finished (674)/processor action (678)." The user can optionally input additional data, perform manual verifications, send data, or react to errors in the data, for example. Upon completion of the manual processing, the data may be sent to an internal or external system or partner. In some implementations, additional data processing can occur on the data before it is sent to other parties. For example, documents, such as reports, can be created and attached to the outgoing service session.

As mentioned above, collected and/or preprocessed data may be sent to the backbone 106 or an external support provider 108 where further processing may take place. After the data has been sent, the session status is changed to "in process (672)/finished (674)/sent to external provider (680)." For services expecting a result, a confirmation about receiving the data may also be sent.

The sent data will be processed and may be stored on the backend side (backbone 106). During this step, the status of the session does not change. As a result, documents may be created, (e.g., the final report or a receiving confirmation), and further, can be attached to the service session. Next, documents created in the backbone may be sent back to the customer system. After sending the documents, the status of the according business object instance, such as the service delivery business object instance, is changed to "in process (672)/finished (674)/to be confirmed (682)." Here, the result may be confirmed. For example, session types with manual interaction can allow the results of the session to be confirmed. If a confirmation is made, the session may be closed. The status is then changed to "closed (684)/finished (674)/finished (686)" indicating that no changes to the session are expected. Follow-up sessions may be started after the processing state 656 has been declared "finished." In some implementations, the status may be changed to "closed (684)/finished (674)/finished (686)" without confirmation. A session may be cancelled while in process if it is determined unnecessary to continue. If a session is cancelled, the status is changed to "cancelled (688)/<existing state>/<existing state>" indicating that only the lifecycle state 652 changes. This may facilitate a user in determining the point or state of cancellation at a later date.

Although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A computer program product for supporting a distributed business application, the computer program product comprising computer readable instructions embodied on tangible, non-transitory media and operable when executed to:
   automatically monitor the distributed business application for potential incidents;
   facilitate substantially continuous data communications among the distributed business application, a remote support module, and at least one support provider for the distributed business application based on the automatic monitoring, the continuous data communications in a protocol associated with a plurality of services in the distributed business application and with a plurality of incidents for these services, wherein the remote support module is executed by a back-end system associated with the distributed business application, the back-end system providing service request processing for service requests from the distributed business application;
   upon identification of a potential incident, provide integrated incident management service in the distributed business application, the integrated incident management service operable to collect context data associated with the potential incident and communicate the collected context data to the remote support module and the support provider; and
   provide a software maintenance management service to the distributed business application for at least one identified potential incident from at least one of the remote support module or the support provider based on the collected context data,
   wherein the software maintenance management service receives an update from the remote support module based on the collected system context data and prior to identification of a related incident, and
   wherein the integrated incident management service is operable to execute a resolution based on the collected context data based on communications with the software maintenance management service.

2. The computer program product of claim 1, the integrated incident management service operable to:
   automatically collect system context data associated with the distributed business application at various intervals;
   communicate the collected system context data to the remote support module using the substantially continuous data exchange; and
   automatically collect specific context data upon identification of the potential incident in the distributed business application.

3. The computer program product of claim 2, at least a portion of the various intervals of the automatic collection of system data occurring on a regular basis established by the remote support module.

4. The computer program product of claim 2, further operable to present the collected specific context data to a user of the distributed business application via an interface where the user adds additional specific context data to the collected specific context data.

5. The computer program product of claim 2, further operable to:
   automatically identify a recipient of the specific context data, the recipient comprising the remote support module associated with the distributed business application or one of a plurality of third party support providers; and
   communicate the collected specific context data to the support recipient using the protocol.

6. The computer program product of claim 5, the potential incident comprising a business process error and the software further operable to:
   receive a solution proposal from the support recipient;
   automatically present the solution proposal to a user associated with the business process; and
   execute the resolution using user input based on the solution proposal.

7. The computer program product of claim 2, further operable to:
   parse the collected system context data into first and second portions; and
   wherein communicating the collected system context data to the remote support module comprises communicating the first portion to the remote support module and communicating the second portion to a third party.

8. The computer program product of claim 2, the collected specific context data associated with a service session object.

9. The computer program product of claim 8, further operable to:
   generate the service session object;
   update the service session object with a confirmed service schedule associated with a support provider;
   initiate a service session based on the confirmed service schedule;
   collect the specific context data using the service session object; and
   communicate the specific context data to the support provider, at least some of the specific context data processed by the service session object.

10. The computer program product of claim 2, the system context data comprising user interface data, portal data, application data, and technology data.

11. The computer program product of claim 1, the software maintenance management service operable to:
   automatically apply the update to one of the services in the distributed business application.

12. The computer program product of claim 11, the update comprising a customer-specific update.

13. The computer program product of claim 1, further operable to present a service desk interface to an adminystrator of the distributed business application, the interface displaying information associated with a plurality of potential incidents.

14. The computer program product of claim 13, the service desk interface communicably coupled with a service desk module operable to:
  receive a potential incident report from the remote business application;
  automatically classify the potential incident report; and
  automatically forward the potential incident to the remote support module.

15. The computer program product of claim 14, the service desk module further operable to determine a service level agreement associated with the potential incident.

16. The computer program product of claim 1, a plurality of the communications between the distributed business application and the remote support module comprising asynchronous communications.

17. The computer program product of claim 1, wherein the integrated incident management service is further operable to aggregate and format the collected context data into a standard format before communicating the collected context data to the support provider.

18. The computer program product of claim 1, wherein the integrated incident management service is provided based on an information technology (IT) service and application management deployment unit.

19. The computer program product of claim 18, wherein the IT service and application management deployment unit includes a system administration process component, a service delivery processing process component, and an IT change management process component.

20. A computer-implemented method performed by at least one processor for supporting a distributed business application, the method comprising:

using the at least one processor to automatically monitor the distributed business application for potential incidents;

facilitating substantially continuous data communications among the distributed business application, a remote support module, and at least one support provider for the distributed business application based on the automatic monitoring, the continuous data communications in a protocol associated with a plurality of services in the distributed business application and with a plurality of incidents for these services, wherein the remote support module is executed by a back-end system associated with the distributed business application, the back-end system providing service request processing for service requests from the distributed business application;

upon identification of a potential incident, providing integrated incident management service in the distributed business application, the integrated incident management service operable to collect context data associated with the potential incident and communicate the collected context data to the remote support module and the support provider; and providing a software maintenance management service to the distributed business application for at least one identified potential incident from at least one of the remote support module or the support provider based on the collected context data, wherein the software maintenance management service receives an update from the remote support module based on the collected system context data and prior to identification of a related incident, and wherein the integrated incident management service is operable to execute a resolution based on the collected context data based on communications with the software maintenance management service.

* * * * *